United States Patent
Otake et al.

(10) Patent No.: US 7,088,404 B2
(45) Date of Patent: Aug. 8, 2006

(54) SUBSTRATE FOR ELECTRO-OPTICAL DEVICE HAVING PARTICULAR CONCAVE PORTIONS AND CONVEX PORTIONS AND FLAT SECTION ON THE SURFACE OF A BASE LAYER

(75) Inventors: Toshihiro Otake, Okaya (JP); Makoto Mizuta, Matsumoto (JP); Mutsumi Matsuo, Misato-mura (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 10/733,176

(22) Filed: Dec. 11, 2003

(65) Prior Publication Data

US 2004/0160553 A1    Aug. 19, 2004

(30) Foreign Application Priority Data

Dec. 12, 2002 (JP) ............................. 2002-360977
Mar. 10, 2003 (JP) ............................. 2003-064033

(51) Int. Cl.
*G02F 1/1335* (2006.01)
*G02F 1/1333* (2006.01)

(52) U.S. Cl. ...................................... 349/113; 349/114
(58) Field of Classification Search ................ 349/158, 349/113, 114, 110, 112
See application file for complete search history.

(56) References Cited

U.S. PATENT DOCUMENTS 5,204,765 A * 4/1993 Mitsui et al. .................. 359/70
6,130,736 A * 10/2000 Sasaki et al. ................ 349/122
6,163,405 A * 12/2000 Chang et al. ................ 359/599
6,195,140 B1 * 2/2001 Kubo et al. .................... 349/44
6,501,522 B1 * 12/2002 Chang et al. ................ 349/113
6,809,491 B1 10/2004 Nakashima et al.
6,924,858 B1 * 8/2005 Nagayama et al. ......... 349/113

FOREIGN PATENT DOCUMENTS

| JP | 10-319422 | 12/1998 |
|----|-----------|---------|
| JP | 11-109417 | 4/1999 |
| JP | 11-281972 | 10/1999 |
| JP | 2000-047204 | 2/2000 |
| JP | 2000-105370 | 4/2000 |
| JP | 2000-171794 | 6/2000 |
| JP | 2001-056464 | 2/2001 |
| JP | 2001-075091 | 3/2001 |

(Continued)

OTHER PUBLICATIONS

Communication from Japanese Patent Office regarding related application.

(Continued)

*Primary Examiner*—Andrew Schechter
*Assistant Examiner*—Mike Qi
(74) *Attorney, Agent, or Firm*—Harness, Dickey & Pierce, P.L.C.

(57) ABSTRACT

A substrate is provided for an electro-optical device comprising a substrate, a base layer formed on the substrate and having a plurality of concave portions or convex portions on the surface thereof, and a reflecting layer formed on the base layer and having light reflecting property, wherein a plurality of concave portions or convex portions is formed so as not to extend to the edge of the base layer. According to this construction, a surface provided with concavo-convex portions is spaced apart from the edge of the base layer. Therefore, the sidewall surface that forms the edge is substantially flat. As a result, the base layer does not peel from the substrate when developing the photosensitive material which becomes the base layer.

8 Claims, 25 Drawing Sheets

FOREIGN PATENT DOCUMENTS

| | | |
|---|---|---|
| JP | 2001-188107 | 7/2001 |
| JP | 2001-201742 | 7/2001 |
| JP | 2001-281650 | 10/2001 |
| JP | 2001-356335 | 12/2001 |
| JP | 2002-098951 | 4/2002 |
| JP | 2002-098955 | 4/2002 |
| JP | 2002-162646 | 6/2002 |
| JP | 2002-265876 | 9/2002 |
| JP | 2002-341333 | 11/2002 |
| JP | 2003-075987 | 3/2003 |
| KR | 1999-014250 | 2/1999 |
| KR | 2002-64470 | 8/2002 |
| KR | 2002-0065783 | 8/2002 |
| KR | 2002-0092036 | 12/2002 |

OTHER PUBLICATIONS

Communication from Japanese and Korean Patent Office re: related applications.

* cited by examiner

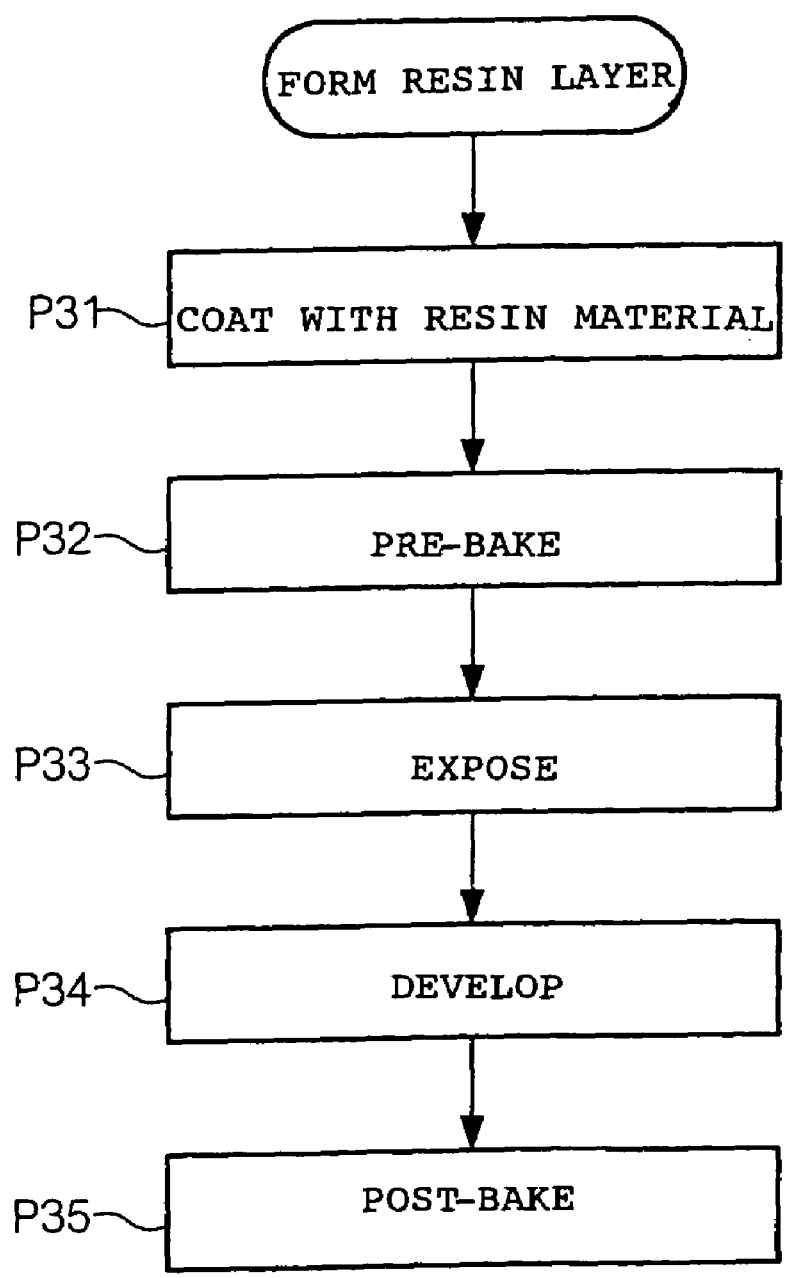

FIG. 14
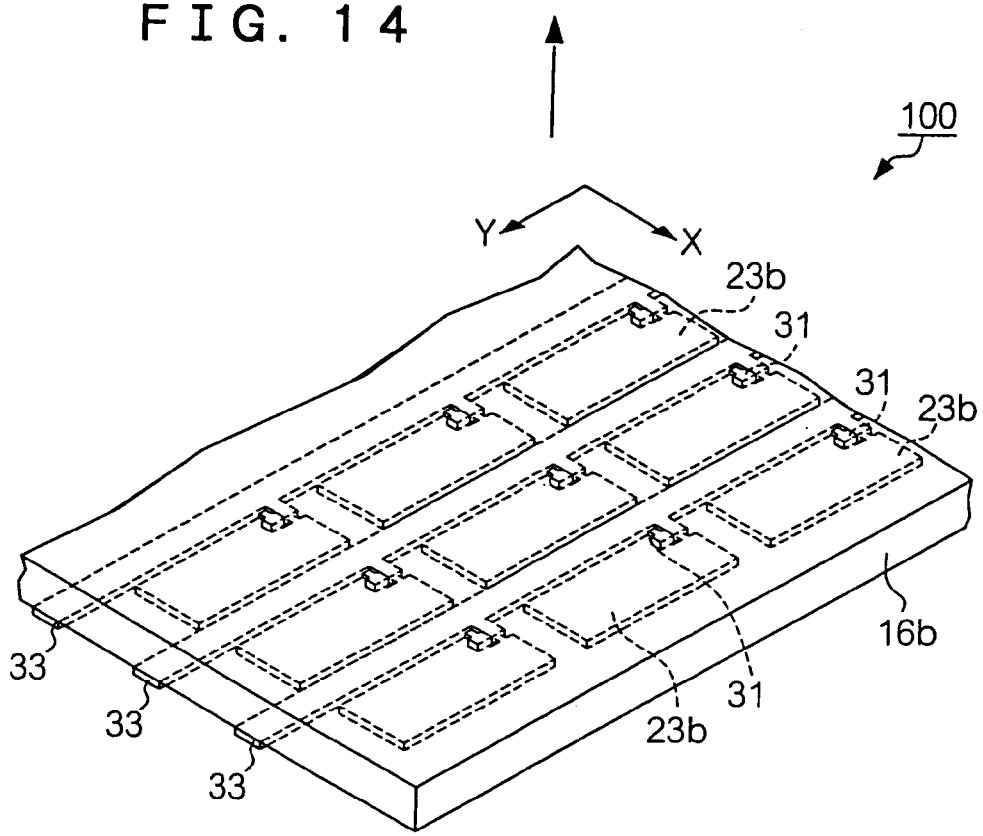
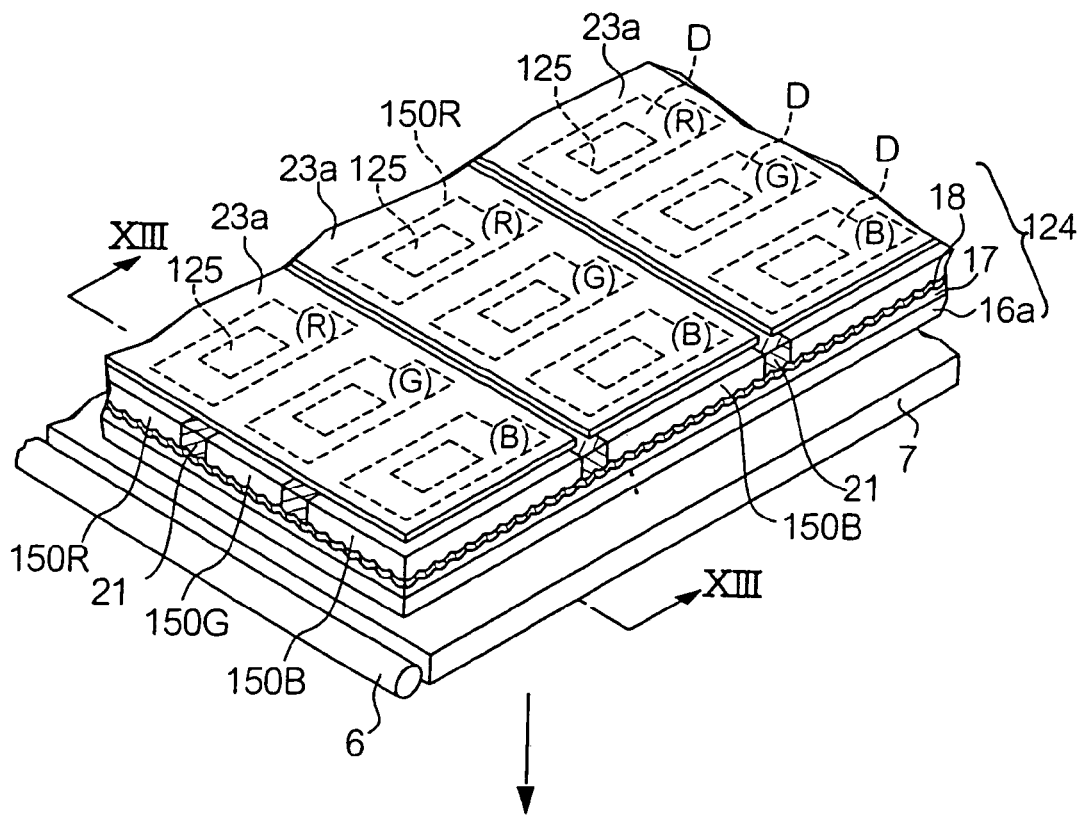

FIG. 30A
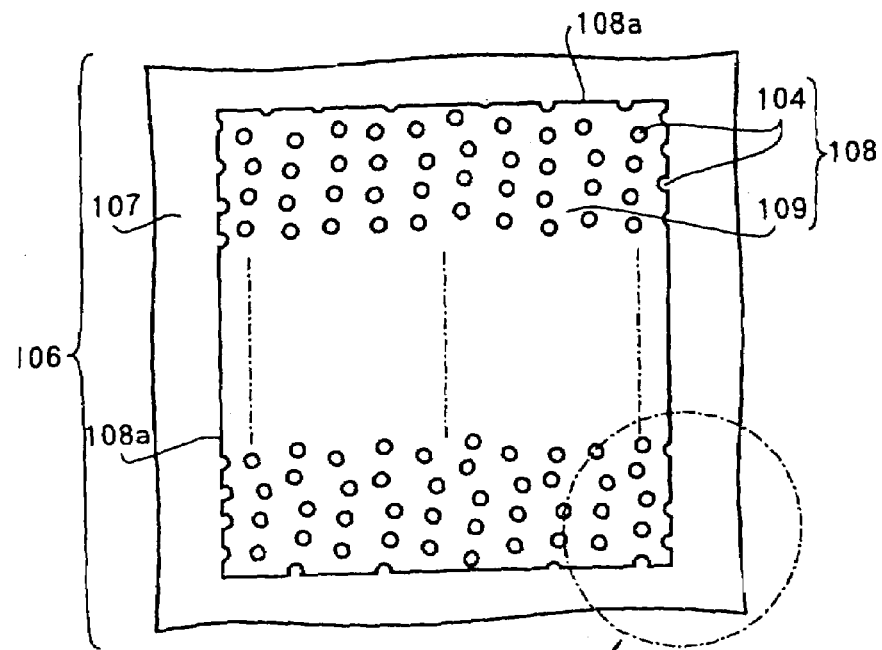
FIG. 30B
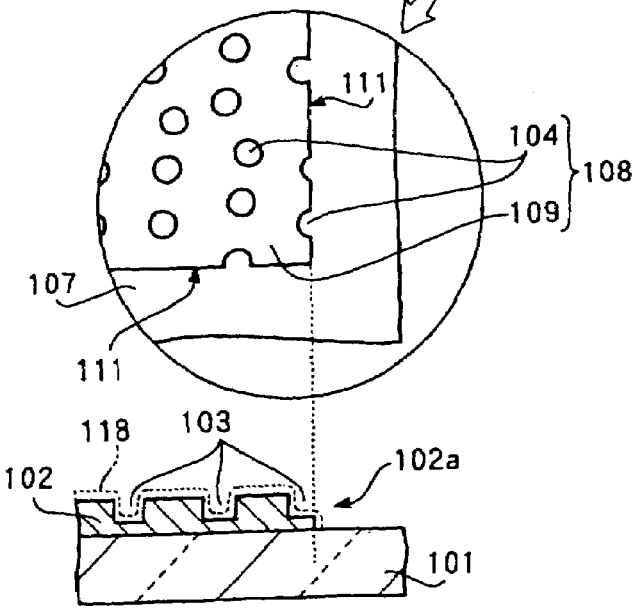
FIG. 30C

SUBSTRATE FOR ELECTRO-OPTICAL DEVICE HAVING PARTICULAR CONCAVE PORTIONS AND CONVEX PORTIONS AND FLAT SECTION ON THE SURFACE OF A BASE LAYER

BACKGROUND OF THE INVENTION

1. Field of the Invention

The present invention relates to a substrate for an electro-optical device having a light reflecting layer with concavo-convex portions formed on the surface thereof, a method of manufacturing the substrate for the electro-optical device, an electro-optical device using the substrate for the electro-optical device, an electronic apparatus using the electro-optical device, and a mask for forming a base layer having concavo-convex portions on the surface thereof.

2. Description of the Related Art

Electro-optical devices such as liquid crystal devices are widely used for electronic apparatuses such as cellular phones and portable information terminals. For example, the electro-optical devices are used as display portions for visually displaying various information segments related to the electronic apparatuses.

The electro-optical device comprises, for example, a substrate for an electro-optical device having a reflecting layer and an electro-optical material layer surface-contacting with the reflecting layer such as a liquid crystal layer. The reflecting layer reflects external light such as sunlight and indoor light, thereby supplying the external light to the liquid crystal layer, etc.

In this way, in the case where the external light is reflected by the reflecting layer, when the surface of the reflecting layer is a smooth plane, the background of images such as characters, numbers, and figures displayed outside are mirror-shaped. Therefore, it is difficult to recognize the entire display surface. In order to solve the problem, a technique of forming a plurality of concavo-convex portions, that is, peaks and valleys (concave portions and convex portions (non-concave portions), respectively) on the surface of the reflecting layer and of scattering reflected light has been proposed.

In this way, in order to form the concavo-convex portions on the surface of the reflecting layer, it has been conventionally proposed that a resin layer is formed on a substrate, thereby forming the concave portions or the convex portions with the irregular arrangement in a planar direction on the surface of the resin layer; and thereafter, the reflecting layer is formed on the resin layer, thereby to obtain the substrate provided with the reflecting layer having the irregular surface.

For example, a mask (a photo-mask) 106 illustrated in FIGS. 30A and 30B is used for manufacturing the conventional substrate. When the substrate, illustrated in FIG. 30C, which has a resin layer (a base layer) 102 that is formed on a substrate 101 and concave portions 103 are formed on the surface of the resin layer 102, is manufactured, the mask 106 is formed by disposing a light-shielding layer 108 that consists of holes 104 corresponding to the concave portions 103 and light-shielding portions 109 corresponding to the convex portions on a light transmitting substrate 107.

A layer formed of a photosensitive resin material is exposed through the mask 106. Furthermore, the exposed layer formed of the resin material is developed. As a result, the concave portions 103 are formed on the surface of the resin layer 102. That is, the concavo-convex portions are formed. Furthermore, when a reflecting layer 118 is formed on the resin layer 102, it is possible to form the concavo-convex portions corresponding to the concavo-convex portions of the resin layer 102 on the surface of the reflecting layer 118.

In the light-shielding layer 108 of the conventional mask 106, the positions of the holes 104 corresponding to the light-shielding portions 109 are not specifically determined. Therefore, some holes in the outermost circumferential region among a plurality of holes 104 intersect with an edge of the light-shielding portions 109, that is, an edge 108a of the light-shielding layer 108.

When the conventional mask 106 is used, some parts of the concave portions 103 are formed at an edge 102a of the resin layer 102 on the substrate 101 so as to correspond to the holes 104 which are arranged to intersect with an edge 108a of the light-shielding layer 108, resulting in the edge of the resin layer 102 being made thin in thickness. There is a fear that the thin edge is peeled from the substrate 101 during the development treatment. The peeled pieces of the substrate are again attached onto the substrate 101 or the resin layer 102 after the development treatment and as a result, there is defectiveness in the substrate due to foreign matters. When the pieces are peeled from or attached again onto the resin layer 102, the pattern of the reflecting layer on the pieces 102 becomes uneven. This causes the reflection property of the reflecting layer to become uneven; and when it displays by using the reflecting light, there is a fear that it displays unevenly.

Furthermore, a so called transflective liquid crystal device commonly has a transflective layer for transmitting light and reflecting external light between a liquid crystal layer and a back light unit. A feature of the transflective layer is known as being constructed to transmit light through an aperture and scatter external light by a concavo-convex reflecting surface (a light reflecting portion). Herein, the scattering property is given to the transflective layer in order to prevent the external light from being specularly reflected at the transflective layer and to prevent background or indoor light reflected on the screen from being recognized by an observer, as described above.

As a technique of manufacturing such a transflective layer, one has been proposed to use molding materials such as a photosensitive resin. Specifically, as illustrated in FIGS. 31 and 32, an aperture 512 for transmitting light is provided on a substrate 500 such as glass. A resin layer (a base layer) 510 is formed on the substrate 500 by using a photosensitive resin, the resin layer having a surface provided with concavo-convex portions. Thereafter, a material of light reflectivity, such as Aluminum (Al) is formed only on the concavo-convex portions of the resin layer 510. As a result, a reflecting layer 520 of a shape which corresponds to the shape of the concavo-convex portions of the resin layer 510 is formed. When the resin layer 510 has a light transmitting property, even if the aperture 512 is not formed on the resin layer 510, it is possible to realize a light transmitting display. However, in order to reduce optical loss, it is preferable to form the aperture 512 on the resin layer 510.

The resin layer 510 having the aperture 512 is manufactured, for example, as follows. First, the substrate 500 is coated with positive photosensitive resin; and the photosensitive resin is exposed by a mask 550 which is illustrated in FIG. 33. A light transmitting portion 552 substantially centered in the mask 550 is used for forming the aperture 512 of the resin layer 510. The minute light transmitting portions 554, randomly arranged at the periphery of the light transmitting portion 552, are used for forming a surface provided with the concavo-convex portions on the resin layer 510. When the development treatment is performed after exposing the photosensitive resin by the mask 550, the aperture 512 and the resin layer 510, which are illustrated in FIG. 31, having a surface provided with the concavo-convex portions are formed.

However, in the mask 550, the light transmitting portions 554 for the concavo-convex portions are arranged at an edge of light transmitting portion 552 for the aperture 512 to be close to each other. As illustrated in an enlarged view in FIG. 33, some of the light transmitting portions 554 transmit light at the state ranged along the light transmitting portion 552. Therefore, the sidewall surface 510e of the aperture 512 in the resin layer 510 is wrinkled as illustrated in the plan view of FIG. 31.

However, when the photosensitive material is exposed so that the sidewall surface 510e is wrinkled, there is a probability that resin pieces are peeled from the sidewall surface 510e in the development step. As a result, the resin pieces, which are mixed with a developer, are again attached onto the resin layer. Therefore, this causes a liquid crystal panel to deteriorate in the quality thereof or become defective.

SUMMARY

The present invention is contrived to solve the above problems, and the objects of the present invention include providing a method of manufacturing a substrate for an electro-optical device, which is capable of forming a resin layer which is not peeled from a substrate particularly in exposure and development steps, a substrate for an electro-optical device having a light reflecting layer provided with concavo-convex portions on the surface thereof, an electro-optical device using the substrate for the electro-optical device, an electronic apparatus using the electro-optical device, and a mask for forming a base layer having a surface provided with the concavo-convex portions.

According to the present invention, a method of manufacturing a substrate for an electro-optical device, having a base layer provided with concavo-convex portions on the surface thereof, and a reflecting layer disposed on the base layer and having a light reflecting property, comprises a coating step of coating a substrate with a photosensitive material, an exposure step of exposing the photosensitive material on the surface of the photosensitive material so that a region outside of a plurality of isolated patterns disposed in a closed region and dispersed into the closed region so as not to intersect with the outline of the closed region is one of an exposed portion or a portion which is not exposed, and so that the other region is the other of the exposed portion or the portion which is not exposed, a development step of forming the base layer by developing the photosensitive material exposed by the exposure step, and a step of forming a reflecting layer having a light reflecting property on the base layer. The above is referred to as a first feature of the present invention.

According to the method of manufacturing a substrate for an electro-optical device, in the exposure step, a surface provided with concavo-convex portions is exposed in order to be spaced apart from the edge of the base layer. Therefore, the sidewall surface that forms the apertures is exposed in order to be substantially flattened. As a result, this method can solve the above problem that in the development step of the photosensitive material, a part of the photosensitive material, which becomes the base layer (the resin layer) is peeled from the substrate and again attached onto the substrate.

Herein, in the first feature of the present invention, the closed region may be interposed between a first outline surrounding the closed region and a second outline inside the first outline. The above is referred to as a second feature of the present invention.

According to the method of manufacturing the substrate for the electro-optical device, in the exposure step, the surface with concavo-convex portions is exposed in order to be spaced apart from the edge of the outline, that is, the aperture. Therefore, the sidewall surface that forms the edge of the base layer is exposed so as to be substantially flattened. As a result, this method can solve the above problem that in the development step of the photosensitive material, a part of the photosensitive material, which becomes the base layer (the resin layer) is peeled from the substrate and again attached onto the substrate.

In addition, in the exposure step, the photosensitive material may be exposed so that the minimum value of the distance between each of the plurality of the isolated patterns and the second outline is 4 μm or more. The above is referred to as a third feature of the present invention. In this way, it is possible to ensure adequately the flattening property of the sidewall surface that forms the aperture, by keeping the edge of the aperture at a distance of 4 μm or more spaced apart from the edge of the surface provided with the concavo-convex portions.

Further, in the exposure step, the photosensitive material may be exposed so that the minimum value of the distance between each of the plurality of the isolated patterns and the second outline is 12 μm or less. The above is referred to as a fourth feature of the present invention. In this way, it is possible to ensure adequately the scattering property of the substrate for the electro-optical device by making the interval between the edge of the aperture and the edge of the surface provided with the concavo-convex portions 12 μm or less.

Furthermore, in the second, the third and the fourth features of the present invention, the step of forming a reflecting layer further comprises a concavo-convex-portion absorbing-layer forming step of forming on the base layer a concavo-convex-portion absorbing layer for absorbing some parts of the concavo-convex portions formed on the surface thereof, and the reflecting layer may be formed on the concavo-convex-portion absorbing layer formed in the concavo-convex-portion absorbing-layer forming step.

The above is referred to as a fifth, a sixth, and a seventh feature of the present invention respectively. In this way, it is possible to make the concavo-convex portions of the reflecting layer smooth by forming a concavo-convex-portion absorbing layer for absorbing the concavo-convex portions on the surface thereof.

In addition, according to the first feature of the present invention, in the exposure step, the minimum value of the distance between each of the plurality of the isolated patterns and the outline surrounding the closed region may be within a predetermined range. The above is referred to as an eighth feature of the present invention.

Herein, the predetermined range is 4 μm to 12 μm. The above is referred to as a ninth feature of the present invention. Further, the predetermined range is 4 μm to 7 μm. The above is referred to as a tenth feature of the present invention.

When the base layer is exposed and developed as described above, a part of the surface provided with the concavo-convex portions, that is, a thin portion is not formed at the edge of the finished base layer. Therefore, the edge of the base layer is firmly fixed to the substrate and is hardly peeled from the substrate.

In addition, in the first to tenth features, a developer is sprayed on the base layer in the development step. The above is referred to as an eleventh feature of the present invention. Herein, a method of dipping an object (the substrate having the base layer according to the present invention) to be developed into the developer as well as a method of spraying the substrate with the developer is considered as a development method. However, in the case of a conveyor system where an object is developed while being loaded on a transport belt and transported, workability is higher in the spraying method than in the dipping method. In this case, in the spraying method, larger stress is generated in the base layer that is the object to be developed than in the dipping method. Therefore, it is more probable that the base layer will be peeled from the substrate in the spraying method. However, when an edge of the base layer is firmly fixed to the substrate as in the present invention, even if the development step based on the spraying method is adopted, it is possible to surely prevent the base layer from being peeled from the substrate.

Further, the present invention provides a method of manufacturing an electro-optical device comprising the method of manufacturing a substrate for an electro-optical device according to the first to the eleventh features of the present invention. The above is referred to as a twelfth feature of the present invention.

In addition, the present invention provides a substrate for an electro-optical device comprising a substrate, a base layer formed on the substrate and having a plurality of concave portions or convex portions on the surface thereof and a reflecting layer formed on the base layer and having light reflecting property, wherein the plurality of concave portions or convex portions is formed so as not to intersect with (extend to) the edge of the base layer. The above is referred to as a thirteenth feature of the present invention.

According to the substrate for the electro-optical device, a surface provided with concavo-convex portions is exposed to be spaced apart from the edge of the base layer. Therefore, the sidewall surface that forms the edge becomes substantially flattened. As a result, there is no defectiveness that in the development step of the photosensitive material, a part of the photosensitive material, which becomes the base layer, is peeled from the substrate and again attached onto the substrate.

Herein, the base layer has an aperture in the form of a light transmitting portion for transmitting light, the plurality of concave portions or convex portions is formed so as not to intersect with (extend to) the edge of the aperture, and the reflecting layer may be disposed in a portion excluding the aperture on the surface of the base layer. The above is referred to as a fourteenth feature of the present invention.

In the thirteenth feature of the present invention, the distance between the edge of the base layer and an envelope comprising all of the plurality of concave portions or convex portions in the inside thereof may be in a predetermined range. The above is referred to as a fifteenth feature of the present invention.

When concave portions or convex portions are formed in the edge of the base layer, thick and thin portions are generated in the edge. Therefore, a difference in stress is generated between the thick portions and the thin portions. In particular, the difference in stress is easily generated in the development step. When the difference in stress is generated, it becomes highly probable that the base layer will be peeled from the substrate. On the contrary, when a region having no concave portions, that is, a region having convex portions is disposed in an edge region of the base layer, that is, the periphery thereof, as in the present invention, it is possible to surely prevent the base layer from being peeled from the substrate.

In addition, in the fifteenth feature of the present invention, the predetermined range may be 4 μm to 12 μm. The above is referred to as a sixteenth feature of the present invention. In this way, it is possible to surely prevent the base layer from being peeled from the substrate.

Further, the present invention provides an electro-optical device comprising the substrate for the electro-optical device according to the thirteenth to the sixteenth features of the present invention, a counter substrate that faces the substrate for the electro-optical device, and an electro-optical material disposed between the substrate for the electro-optical device and the counter substrate. The above is referred to as a seventeenth feature of the present invention.

According to the electro-optical device, it is possible to reflect light from inside of the electro-optical device by the function of the reflecting layer contained in the substrate for the electro-optical device and display by using the reflected light. In addition, the concavo-convex portions are formed on the reflecting layer so as to correspond to the concave portions or the convex portions disposed on the surface of the base layer. Therefore, the reflected light becomes scattered light, and the display background does not become a mirror plane. As such, the display is easily recognized.

In addition, the concave portions, that is, dimples do not exist at an edge region, that is, the periphery of the base layer contained in the substrate for the electro-optical device. Therefore, it is possible to prevent the base layer from being peeled off at the edge thereof and thereby to prevent the reflecting layer from being peeled off. As a result, it is possible to perform stabilized display without disturbance.

Herein, an electro-optical device of the present invention further may comprise a first electrode disposed on the substrate for the electro-optical device and a second electrode disposed on the counter substrate. In addition, the electro-optical material may be a liquid crystal and the liquid crystal is disposed between the first electrode and the second electrode. The above is referred to as an eighteenth feature of the present invention.

In the liquid crystal device, it is possible to perform display by using light reflected by the reflecting layer included in the substrate for the electro-optical device. The reflecting layer of the present invention is hardly peeled off at the edge thereof, suppresses the foreign matters from being mixed due to the reattachment of the peeled pieces, and can always retain a stabilized light reflecting property. Therefore, it is always possible to perform a stable display with high quality.

Further, the present invention provides an electronic apparatus comprising an electro-optical device of the seventeenth or the eighteenth feature as a display unit. The above is referred to as a nineteenth feature of the present invention. According to the substrate for the electro-optical device, it is possible to prevent a portion of the base layer from being peeled from the substrate and again attached onto the substrate in the manufacture step. Therefore, it is possible to improve the quality of the electro-optical device and the electronic apparatus which are provided with the substrate for the electro-optical device.

Furthermore, the present invention provides a mask for forming a base layer having a concave portion and a convex portion on the surface thereof, on a substrate, comprising a convex-portion pattern corresponding to the convex portion and a concave-portion pattern corresponding to the concave portion, wherein the edge of the base layer corresponds to the edge of the convex-portion pattern, and wherein the concave-portion pattern does not intersect with (extend to) the edge of the base layer. The above is referred to as a twentieth feature of the present invention.

Herein, the concave portions are recessed more than the convex portions. The convex portions are protruded more than the concave portions. Therefore, when the concave portions are formed on the surface of a member, the convex portions are inevitably formed beside the concave portions. When the convex portions are formed on the surface of a member, the concave portions are inevitably formed beside the convex portions.

In the pattern for the concave portions and the pattern for the convex portions, one can be formed of a transmitting region, for example, holes, and the other can be formed of a light-shielding region. The foundation of the pattern for concave or convex portions in relation to the transmitting region or the light-shielding region is determined, depending on whether the resin material, that is the object to be exposed, is negative or positive.

When the base layer is formed on the substrate by using the mask according to the present invention, the concave portions, that is, dimples are not formed at the edge of the base layer. Therefore, a thin portion is not formed at the edge thereof. As a result, the adhesion property at the edge improves and it is possible to prevent the base layer from being peeled from the substrate at the edge thereof and again attached onto the substrate again, in the development step regarding the edge thereof.

In addition, the present invention provides a mask for forming a base layer having a concave portion and a convex portion on the surface thereof, on a substrate, comprising a convex-portion pattern corresponding to the convex portion and a concave-portion pattern corresponding to the concave portion, wherein the edge of the convex-portion pattern is positioned outside of the concave-portion pattern. The above is referred to as a twenty-first feature of the present invention.

For example, when the concave-portion patterns comprise holes and the pattern for the convex portions comprises a light-shielding region, the edge of the light-shielding region is always positioned outside of the holes. According to the above construction, this allows the thin portion to be not formed at the edge of the base layer formed by the exposure step using the mask and to maintain the thickness of the edge of the base layer to be uniform. Therefore, it is possible to prevent the edge of the base layer from being peeled from the substrate and again attached onto the substrate.

Further, the present invention provides a mask for forming a base layer having a concave portion and a convex portion on the surface thereof, on a substrate, comprising a convex-portion pattern corresponding to the convex portion and a concave-portion pattern corresponding to the concave portion, wherein the convex-portion pattern has a frame-type region surrounding the concave-portion pattern. The above is referred to as a twenty-second feature of the present invention.

The frame-type region of the convex-portion patterns corresponds to the frame-type periphery of the base layer. In this way, it is possible to prevent the thin portion from being formed in the periphery of the base layer and thereby to prevent the base layer from being peeled from the substrate and again attached onto the substrate.

Herein, in the twentieth to the twenty-second features of the present invention, the edge of the convex-portion pattern is positioned at the outermost part of the concave-portion pattern, but may be positioned 4 µm to 7 µm away from the periphery of the base layer. The above is referred to as twenty-third to twenty-fifth features of the present invention respectively. As a result, it is possible to firmly fix an edge region of the base layer formed by the exposure step using the mask, to the substrate and thereby to prevent the edge region of the base layer from being peeled from the substrate.

BRIEF DESCRIPTION OF THE DRAWINGS

FIG. 11 is a flowchart illustrating a modification of the step of forming the resin scattering layer;

FIG. 14 is an exploded perspective view of the liquid crystal device according to the second embodiment of the present invention;

FIG. 30A is a plan view of an example of a conventional mask;

FIG. 30B illustrates an enlargement of a part of the conventional mask;

FIG. 30C is a cross-sectional view illustrating a construction of a conventional substrate manufactured by using the conventional mask;

DETAILED DESCRIPTION

A. FIRST EMBODIMENT

A-1 Electro-Optical Device

Figure 1:
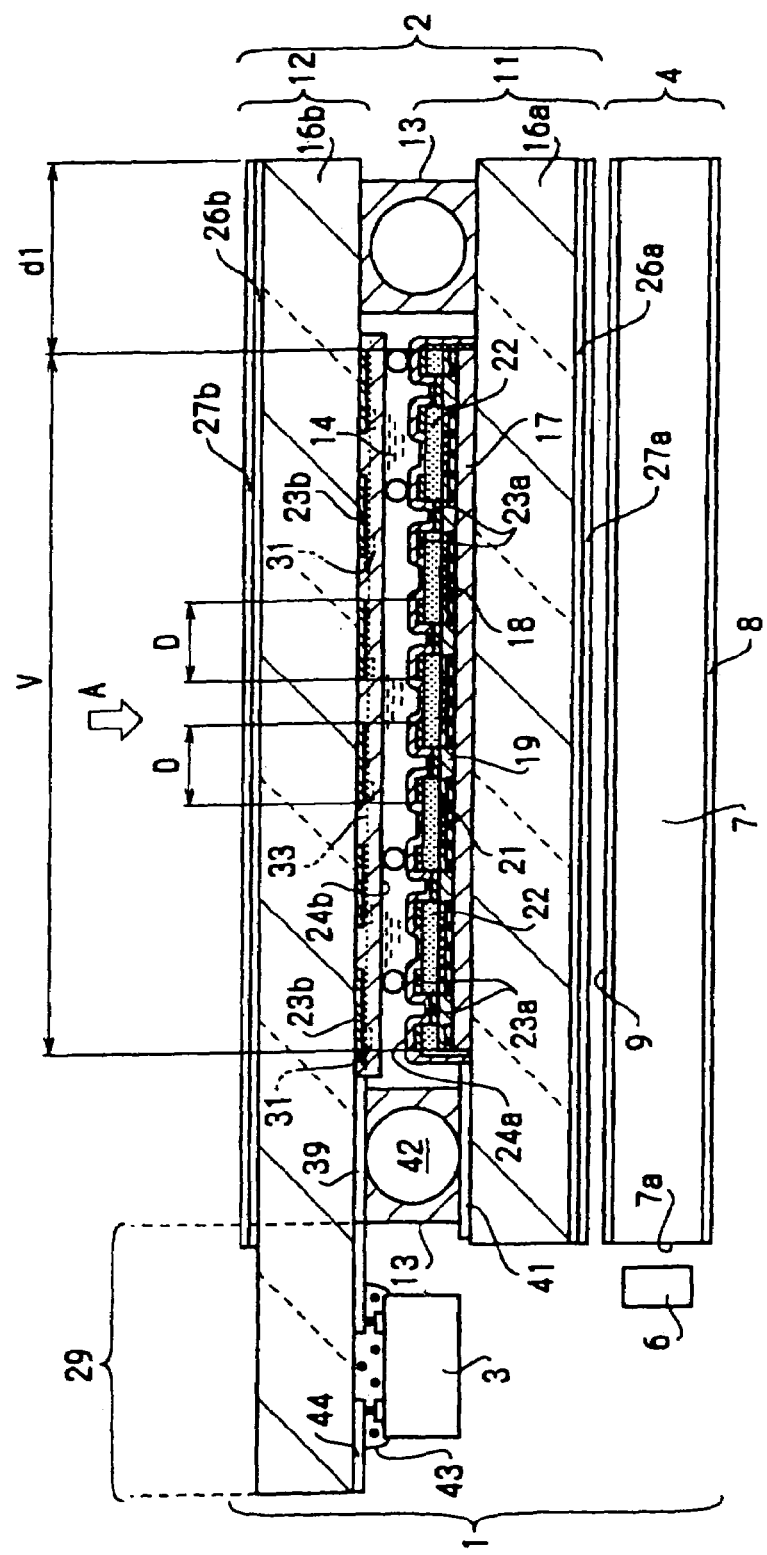
FIG. 1 is a cross-sectional view illustrating a liquid crystal device according to a first embodiment of the present invention.

Hereinafter, the present invention will be described by way of example with regard to a case that it is applied to a liquid crystal device that is an example of an electro-optical device. An embodiment to be described hereinafter is an example of the present invention. The present invention is not limited thereto. The embodiment will now be described in conjunction with drawings if necessary. In the drawings, in order to make important components easily recognized among a construction consisting of a plurality of components, the respective components are shown in relative dimensions different from actual dimensions.

FIG. 1 is a cross-sectional view illustrating a construction of a liquid crystal device according to a first embodiment of the present invention. The liquid crystal device 1 is an active matrix type liquid crystal device using a thin film diode (TFD) that is a double terminal switching element and a transflective liquid crystal device using a color filter substrate as a substrate (a transflective substrate) for an electro-optical device.

In FIG. 1, the liquid crystal device 1 comprises a liquid crystal panel 2, a driving IC 3 mounted on the liquid crystal panel 2, and a lighting system 4. The lighting system 4 is disposed on the rear side of the liquid crystal panel 2 as seen from an observer (from the arrow A direction in FIG. 1, that is, from the top of the drawing) and functions as a back light. The lighting system 4 may be disposed at the observer side of the liquid crystal panel 2 and functions as a front light.

The lighting system 4 comprises a light source 6 comprising of a point light source such as a light emitting diode (LED) or a linear light source such as a cold cathode tube, and a light guider 7 formed of a light transmitting resin. A reflecting layer 8 may be disposed on the rear side of the light guider 7 as seen from the observer, if necessary. A diffusion layer 9 may be disposed at the observer side of the light guider 7, if necessary. A light guide entrance 7a of the light guider 7 extends to the direction vertical to the sheet of FIG. 1. The light generated from the light source 6 is introduced into the inside of the light guider 7 through the light guide entrance 7a.

The liquid crystal panel 2 comprises a color filter substrate 11 that is the substrate for the electro-optical device, an element substrate 12 that faces the color filter substrate, and a square or rectangular frame-type sealant 13 as seen from the arrow A direction, which adheres the two substrates 11 and 12 to each other. A liquid crystal layer is constructed by sealing a liquid crystal 14 in a gap, which is a cell gap, surrounded by the substrate 11, the substrate 12, and the sealant 13.

The color filter substrate 11 comprises a rectangular or square first substrate 16a as shown from the arrow A direction. A resin layer 17 that is a base layer having concavo-convex portions, that is, a combination of concave portions and convex (not-concave) portions is formed on an inner surface of the first substrate 16a. Thereafter, a reflecting layer 18 is formed on the resin layer 17. Colored layers 19 and light-shielding layers 21 are formed on the reflecting layer 18, and then overcoat layers 22 are formed thereon. Straight extending electrodes (data lines) 23a are formed on the overcoat layers 22 in the direction vertical to the sheet of FIG. 1. An alignment film 24a is formed on the electrodes.

An alignment step such as a rubbing step is performed on the alignment film 24a. Therefore, the alignment of liquid crystal molecules around the first substrate 16a is determined. In addition, a retardation film 26a and a polarizer 27a are mounted on an outer surface of the first substrate 16a by adhesion.

Figure 2:
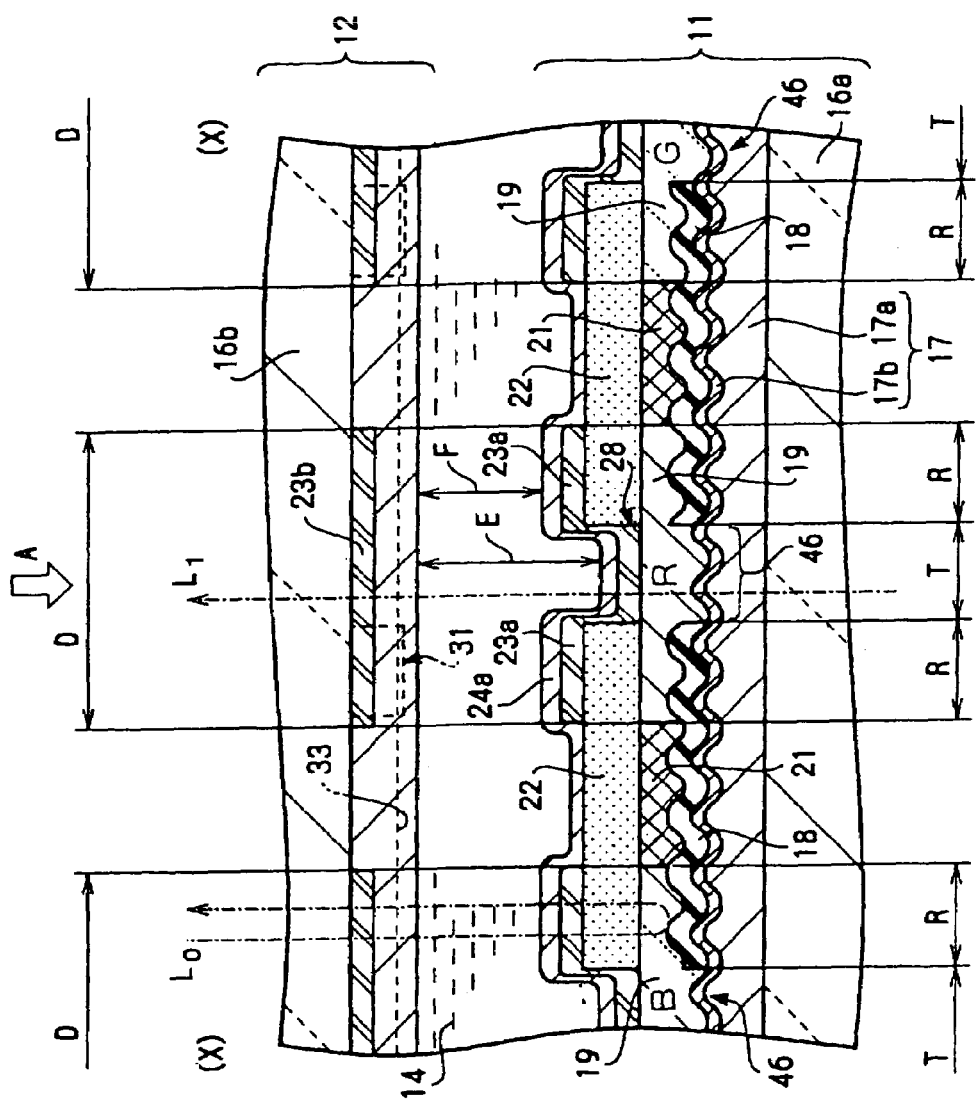
FIG. 2 is a cross-sectional view illustrating an enlargement of a main part of the liquid crystal device according to the first embodiment of the present invention.

The first substrate 16a is made of, for example, light transmitting glass and light transmitting plastic. The resin layer 17 is formed of a double-layered structure consisting of a first layer 17a and a second layer 17b as shown in FIG. 2. Minute concavo-convex portions, that is, minute concave portions and minute convex portions are formed on the surface of the second layer 17b. The reflecting layer 18 is formed of, for example, aluminum (Al) or an Al alloy. The surface of the reflecting layer 18 is concavo-convex shaped corresponding to the concavo-convex portions formed to the resin layer 17. Light reflected by the reflecting layer 18 is diffused by the concavo-convex portions.

Figure 3:
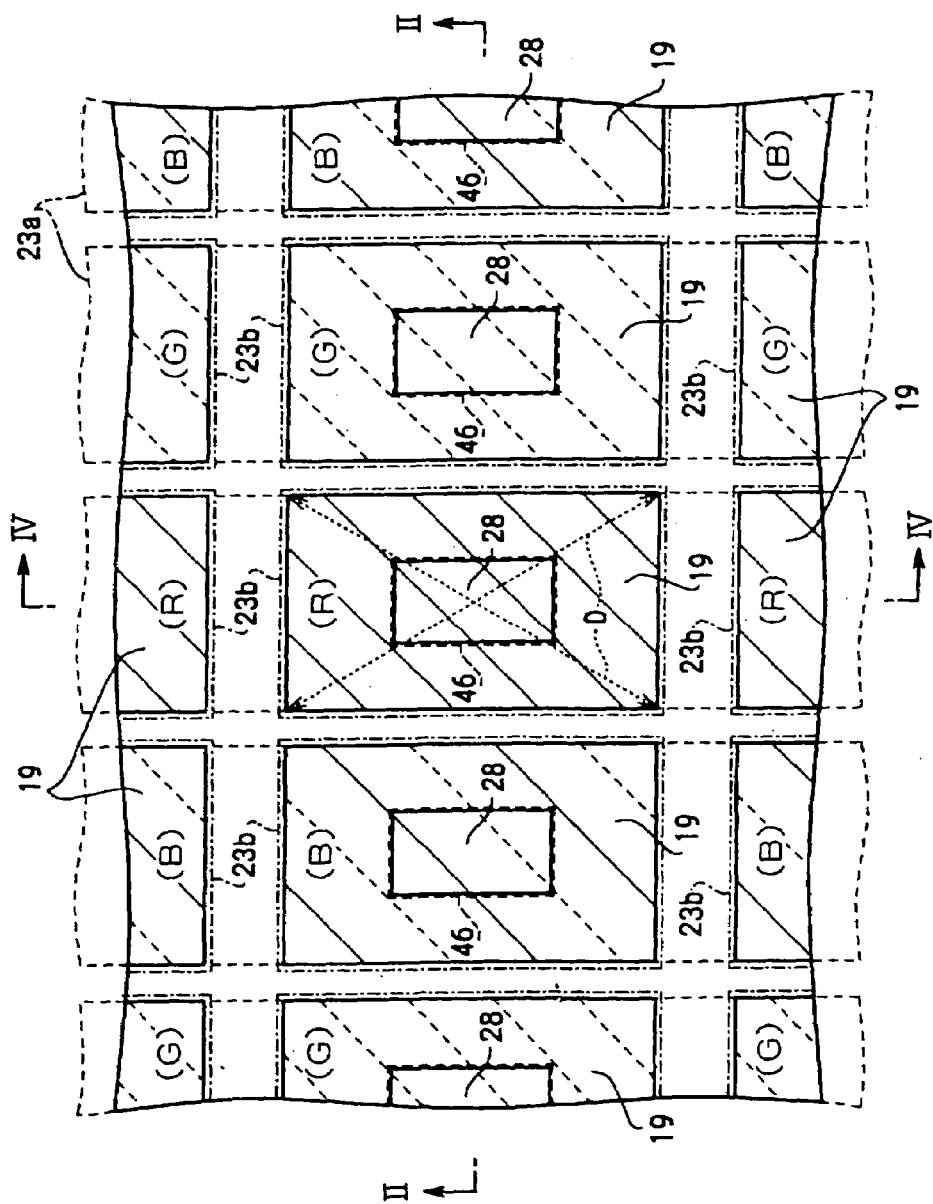
FIG. 3 is a plan view illustrating a planar structure of the main part of the liquid crystal device according to the first embodiment of the present invention.

In the colored layers 19, as shown in FIG. 3, each layer is a rectangular dot. One colored layer 19 has any one of the three primary colors of red (R), green (G), and blue (B). The colored layers 19 having the respective colors are aligned to be in stripe, in delta, in a mosaic, and in other appropriate arrangements. The stripe arrangement is illustrated in FIG. 3. In addition, the colored layers 19 may be also formed in the three primary colors of cyan (C), magenta (M), and yellow (Y). FIG. 2 is a cross-sectional view taken along the line II—II in FIG. 3.

FIG. 1, the light-shielding layers 21 are formed of a light-shielding material such as a black resin material, into which carbon black is dispersed, or chrome (Cr) to fill spaces among a plurality of colored layers 19. The light-shielding layers 21 function as black matrixes and improve the contrast of an image displayed by the light that passes through the colored layers 19. The light-shielding layers 21 are not limited to be made of specific material such as Cr and, for example, may be formed by overlapping two or three of the respective colored layers R, G, and B that form the colored layers 19, that is, the stacking of the colored layers.

The overcoat layers 22 are made of photosensitive resin such as acryl resin and polyimide resin. Apertures 28 that reach the surface of the colored layers 19 are formed on the appropriate positions of the overcoat layers 22, as shown in FIG. 2.

Instead of the apertures 28, bottom-closed holes, that is, the concave portions that reach to the middle portion of the overcoat layers 22 without reaching the surfaces of the colored layers 19, may be formed in the overcoat layers 22.

The data lines 23a that extend linearly to the direction vertical to the sheet of FIG. 2 are made of metal oxide such as indium tin oxide (ITO). A part in the center of the data line 23a is recessed into the aperture 28. An alignment film 24a formed on the data line 23a is made of polyimide. A portion of the alignment film 24a corresponding to the aperture 28 is hollowed toward the aperture 28. In other words, as seen from the arrow A direction in plan view, a plurality of concave portions is formed in the data lines 23a and the alignment film 24a.

In FIG. 1, an element substrate 12 that faces the color filter substrate 11 has a second substrate 16b. In the second substrate 16b, a side where an overhanging portion 29 is formed overhangs outside of the first substrate 16a. A plurality of TFDs 31 that are switching elements is formed on the inner surface of the second substrate 16b. A plurality of pixel electrodes 23b is connected to the TFDs 31. An alignment film 24b is formed on the pixel electrodes 23b. An alignment step such as a rubbing step is performed on the alignment film 24b. Therefore, the alignment of the liquid crystal molecules around the second substrate 16b is determined. A retardation film 26b and a polarizer 27b are mounted on the outer surface of the second substrate 16b by adhesion.

The second substrate 16b is made of light transmitting glass and light transmitting plastic. The pixel electrodes 23b are made of metal oxide such as the ITO. The alignment film 24b is made of, for example, polyimide or the like.

Figure 4:
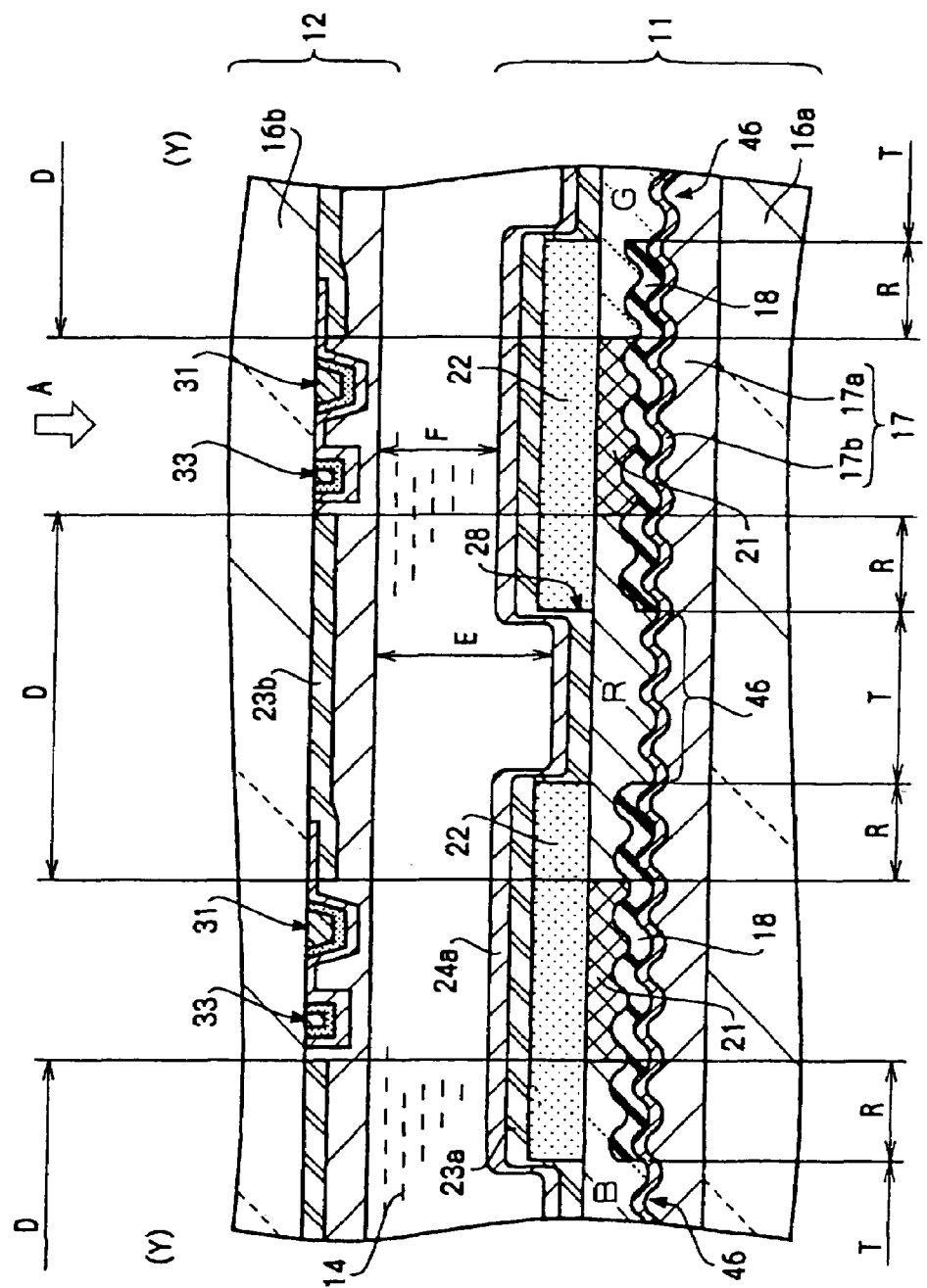
FIG. 4 is a cross-sectional view of the liquid crystal device according to the first embodiment of the present invention.

The respective TFDs 31 are disposed at positions corresponding to the light-shielding layers 21 in the color filter substrate 11 as illustrated in FIG. 4. The TFD 31 is formed by connecting in serial a first TFD component 32a to a second TFD component 32b as illustrated in FIG. 5.

FIG. 4 is a cross-sectional view taken along the line IV—IV of FIG. 3, and therefore, is a cross-sectional view of FIG. 2.

Figure 5:
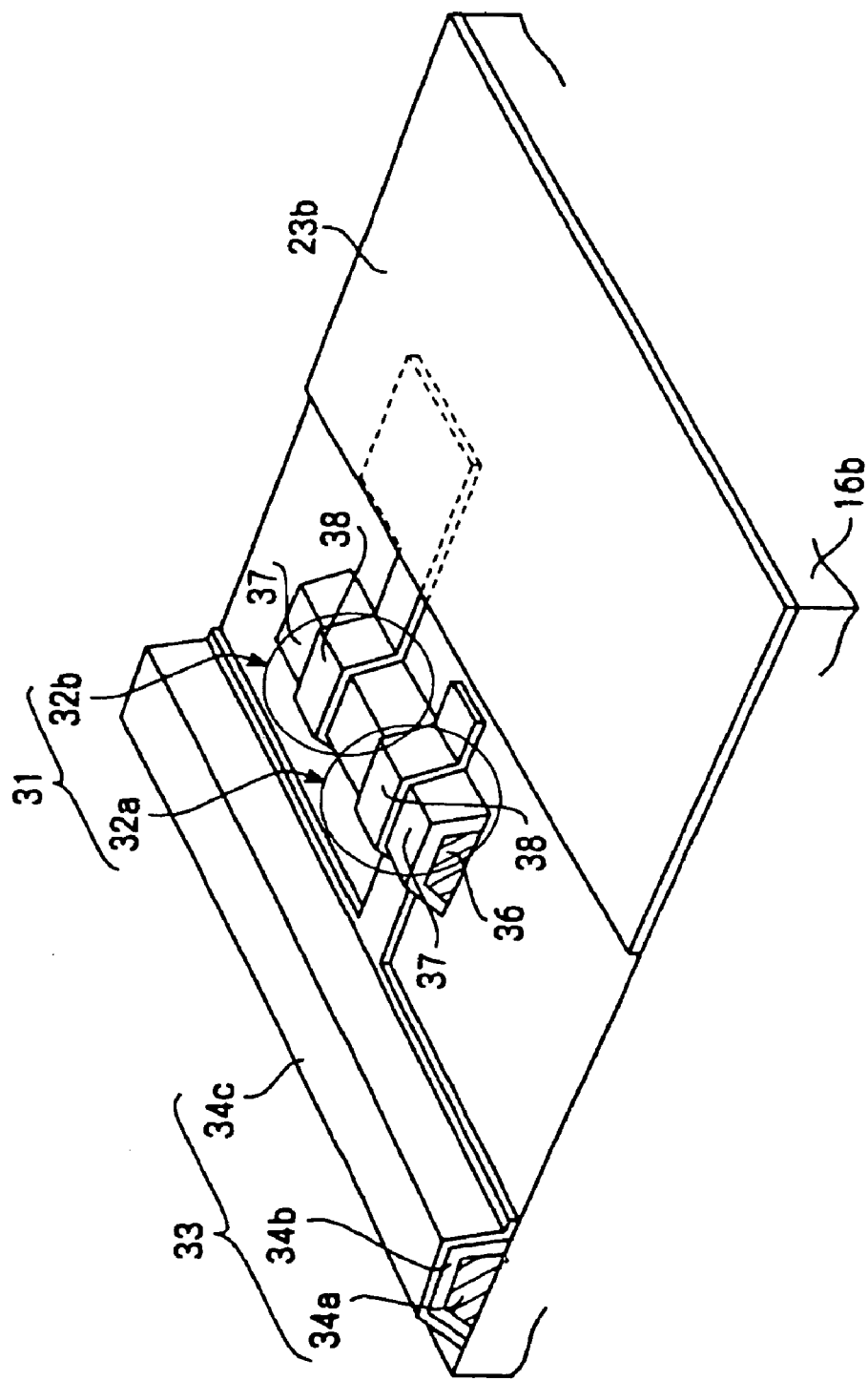
FIG. 5 is a perspective view illustrating an example of a switching element used in the liquid crystal device according to the first embodiment of the present invention.

In FIG. 5, the TFD 31 is formed as follows. First, a first layer 34a of a scanning line 33 and a first metal layer 36 of the TFD 31 are formed by using tantalum tungsten (TaW). Subsequently, a second layer 34b of the scanning line 33 and an insulating film 37 of the TFD 31 are formed by an anode oxidation step. Thereafter, a third layer 34c of the scanning line 33 and a second metal layer 38 of the TFD 31 are formed of chromium (Cr).

In FIG. 4, the data line 23a formed on the color filter substrate 11 extends to the left and right directions of the sheet of FIG. 4. The scanning line 33 formed on the element substrate 12 extends at right angles to the data line 23a, which is perpendicular to the sheet of FIG. 4.

In FIG. 5, the second metal layer 38 of the first TFD component 32a extends from the third layer 34c of the scanning line 33. The pixel electrode 23b is formed so as to overlap the edge of the second metal layer 38 of the second TFD component 32b. Considering that an electric signal flows from the scanning line 33 to the pixel electrode 23b, the electric signal flows in order of the second electrode 38→ the insulating film 37→ the first metal layer 36 in the first TFD component 32a in accordance with the current direction, while the electric signal flows in order of the first metal layer 36→ the insulating film 37→ the second metal layer 38 in the second TFD component 32b.

In other words, in the first TFD component 32a and the second TFD component 32b, a pair of TFD components electrically reverse to each other are serially connected to each other. Such a structure is commonly referred to as a back-to-back structure. It is known that the TFD element having such a structure has a stable characteristic in comparison with the TFD element formed of only one TFD component. A resin layer (not illustrated) may be disposed between the TFD 31 and the substrate 16b, and between the scanning line 33 and the substrate 16b, in order to prevent the first metal layer 36 from being separated from the second substrate 16b and to prevent impurities from being diffused from the second substrate 16b into the first metal layer 36.

In FIG. 1, a wiring 39 is formed on the overhanging portion 29 of the second substrate 16b is formed, for example, simultaneously with forming of the TFDs 31 or the pixel electrodes 23b. A wiring 41 is formed on the first substrate 16a simultaneously with forming of the reflecting layer 18 or the data lines 23a. Spherical or cylindrical conductive materials 42 are dispersed in the sealant 13. The wiring 41 on the first substrate 16a and the wiring 39 on the second substrate 16b are conducted to each other by the conductive materials 42. Therefore, the data lines 23a in the color filter substrate 11 are conducted to a wiring 39 in the element substrate 12.

A driving IC 3 is mounted on the overhanging portion 29 of the element substrate 12 along an anisotropic conductive film (ACF) 43. To be specific, the driving IC 3 is fixed to the overhanging portion 29 along the resin that formed the ACF 43. A bump, that is, a terminal of the driving IC 3 and the wiring line 39 are conductively connected to each other by the conductive particles included in the ACF 43.

A terminal 44 connected outside is formed at the edge of the overhanging portion 29. The terminal 44 connected outside is conductively connected to the bump of the driving IC 3 by the ACF 43. Wiring substrate which is not shown, for example, a flexible wiring substrate is connected to the terminal 44 connected outside by a conductive connection method such as soldering, ACF, and heat seal. Signals and electric power are supplied from electronic apparatuses such as cellular phones and portable information terminals to the liquid crystal device 1 through the wiring substrate.

In FIG. 1, the data lines 23a in the color filter substrate 11 and the pixel electrodes 23b in the element substrate 12 overlap with each other in plan view seen from the arrow A direction. The overlapping region forms a display dot D that it is a minimum unit (sub-pixel) of display. A display region V is formed of a plurality of display dots D arranged in a matrix seen from the arrow A direction. Images such as characters, numbers, and figures are displayed in the display region V.

Each display dot D has the area the same as that of the pixel electrode 23b as illustrated in FIG. 3. In FIG. 3, the pixel electrodes 23b marked with dashed lines are slightly larger than the colored layers 19 marked with solid lines, which is for clarity. The pixel electrodes 23b and the colored layers 19 have almost identical shapes and overlap each other.

In FIG. 3, the dot-shaped colored layers 19 correspond to the display dots D, respectively. In FIGS. 2 and 4, apertures 46 are disposed in the reflecting layer 18 so as to correspond to the display dots D. As illustrated in FIG. 3, the apertures 46 are rectangular in plan view. In FIG. 3, the apertures 46 marked with broken lines are slightly larger than the apertures 28 of the overcoat layers 22, which are marked with the solid line. The circumferences of the apertures 28 are almost the same as the circumferences of the apertures 46 in plan.

When images are displayed in colors using the R, G, and B colored layers 19 according to the present embodiment, a pixel is formed of three display dots D corresponding to the three colored layers 19. When images are mono color displayed without using the colored layers, one pixel is formed of one display dot D.

In FIGS. 2 and 4, portions R where the reflecting layer 18 is disposed among the display dots D are reflection portions. Portions T where the apertures 46 are formed are transmission portions. External light incident from the side of an observer (from the arrow A direction), that is, external light L0 (refer to FIG. 2) incident from the side of the element substrate 12 is reflected from the reflection portions R. Light L1 (refer to FIG. 2) emitted from the light guider 7 of the lighting system 4 of FIG. 1 passes through the transmission portions T.

According to the liquid crystal device having the above structure, when external light such as sun light and indoor light is intense, the external light L0 is reflected from the reflection portions R and is supplied to the liquid crystal layer 14. When the lighting system 4 of FIG. 1 is turned on, planar light emitted from the light guider 7 passes through the transmitting portion T of FIG. 2 and is supplied to the liquid crystal layer 14. Therefore, transflective display is performed.

A scanning voltage is applied to one of the data line 23a and the pixel electrode 23b; a data voltage is applied to other of the data line 23a and the pixel electrode 23b; and each data line 23a and each pixel electrode 23b interposing the liquid crystal layer 14. The TFDs 31 that belong to the display dots D, to which the scanning voltage and the data voltage are applied, are switched to an on state. The alignment of the liquid crystal molecules in the display dots D is maintained so as to modulate the light that passes through the display dots D. Desired images such as characters, numbers, and figures are displayed outside of the element substrate 12 according to whether the modulated light passes through the polarizer 27b of FIG. 1. The case where images are displayed using the external light L0 is referred to as reflective display. The case where images are displayed using the transmitted light L1 is referred to as transmissive display.

When the reflective display is performed, the reflected light L0 passes through the liquid crystal layer 14 twice. When the transmissive display is performed, the transmitted light L1 passes through the liquid crystal layer 14 once. Therefore, when the thickness of the liquid crystal layer 14 is uniform through the reflection portions R and the transmission portions T, the distance by which the reflected light L0 passes through the liquid crystal layer 14 is different from the distance by which the transmitted light L1 passes through the liquid crystal layer 14 between the reflective display using the reflected light L0 and the transmissive display using the transmitted light L1. Therefore, a difference in display occurs between the reflective display and the transmissive display.

According to the present embodiment, the thickness E of the liquid crystal layer 14 is larger in the transmission portion T and the thickness F in the reflection portion R is small by disposing the apertures 28 in the overcoat layer 22. Therefore, it is possible to obtain uniform display quality between the reflective display and the transmissive display.

In the color filter substrate 11 of the liquid crystal device 1 illustrated in FIG. 1, in order to attach the concavo-convex portions illustrated in FIGS. 2 and 4 to the reflecting layer 18 disposed on the inner surface of the first substrate 16a, the concavo-convex portions, that is, the concave portion and the convex portions are formed on the surface of the resin layer 17 of the reflecting layer 18, which is as mentioned above.

Figure 6:
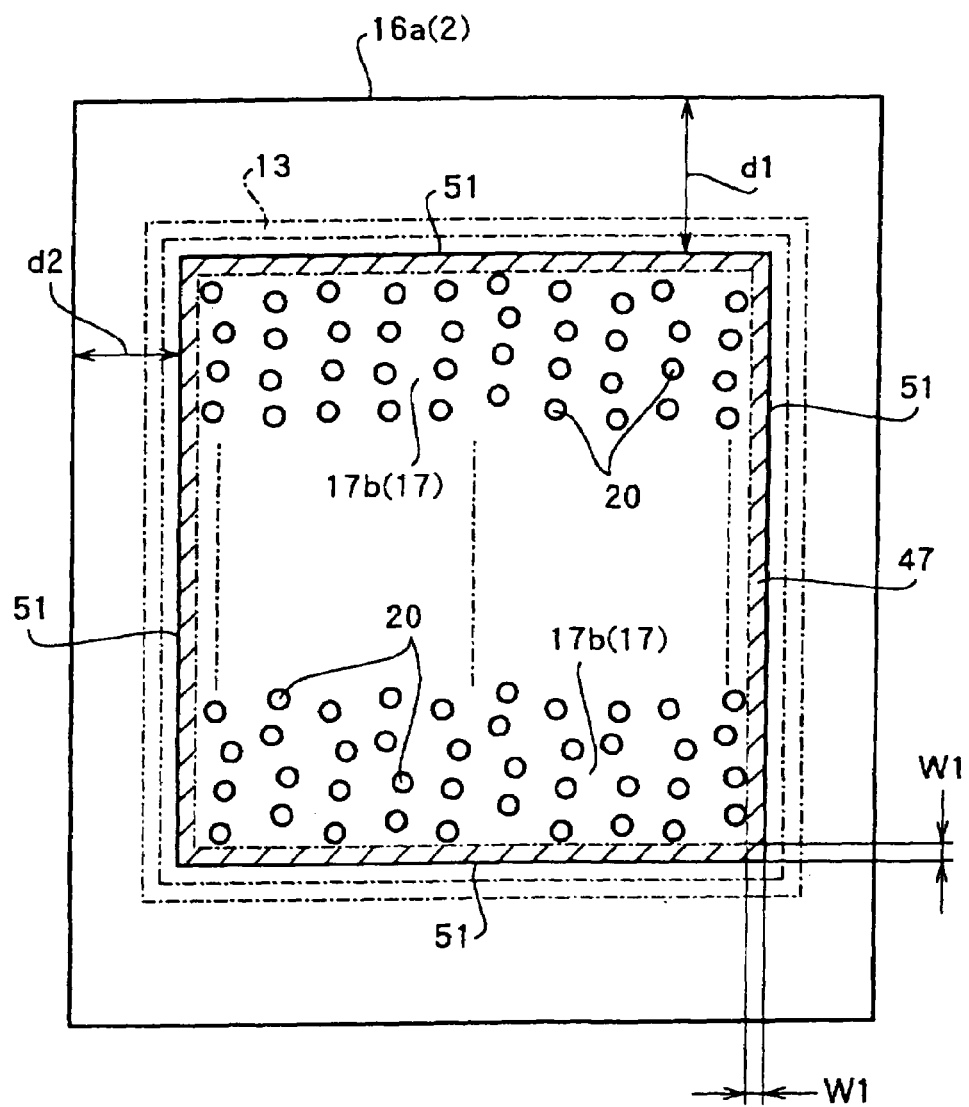
FIG. 6 is a plan view of a resin layer that is a component of the liquid crystal device according to the first embodiment of the present invention.

The resin layer 17 is square or rectangular in plan as illustrated in FIG. 6. The size of the resin layer 17 is almost the same as that of the display region V illustrated in FIG. 1. One side of the resin layer 17 is separated from the outline of the first substrate 16a, that is, the outline of the liquid crystal panel 2 by the distance d1=50 μm to 300 μm. The other side of the resin layer 17 is separated from the outline of the first substrate 16a, that is, the outline of the liquid crystal panel 2 by the distance d2=20 μm to 100 μm.

A frame-type region 47 where the concave portions 20 do not exist is disposed in the outer circumference of the resin layer 17. The concave portions 20 do not intersect with the edge 51 of the resin layer 17 by disposing the frame-type region 47 where the concave portions 20 do not exist in the outer circumference of the resin layer 17. The edge 51 of the resin layer 17 is positioned outside of the concave portions 20.

In the conventional resin layer 102 illustrated in FIG. 30C, the concave portions 103 may exist at the edge 102a of the resin layer 102. The thickness of the resin layer 102 where the concave portions 103 exist is locally reduced. In general, the resin layer 102 is formed of a series of steps of coating the substrate 101 with the photosensitive resin material having a uniform thickness, exposing the photosensitive resin material through the mask (the photomask) having patterns corresponding to the concave portions 103, and developing the exposed photosensitive resin material.

When the concave portions 103 exist in the edge 102a of the resin layer 102 formed as mentioned above and the thickness of the resin layer 102 where the concave portions 103 exist is small, the portion having a small thickness is easily peeled off during the development step. The peeled pieces are again attached onto the substrate after the development step. When the resin layer 102 is again peeled from the substrate 101 and the peeled pieces are attached to the substrate 101, the shape of the surface of the reflecting layer 118 stacked on the resin layer 102 deteriorates. Therefore, the reflected light and furthermore displayed images deteriorate. As a result, it is difficult to recognize the displayed images.

Figure 10A:
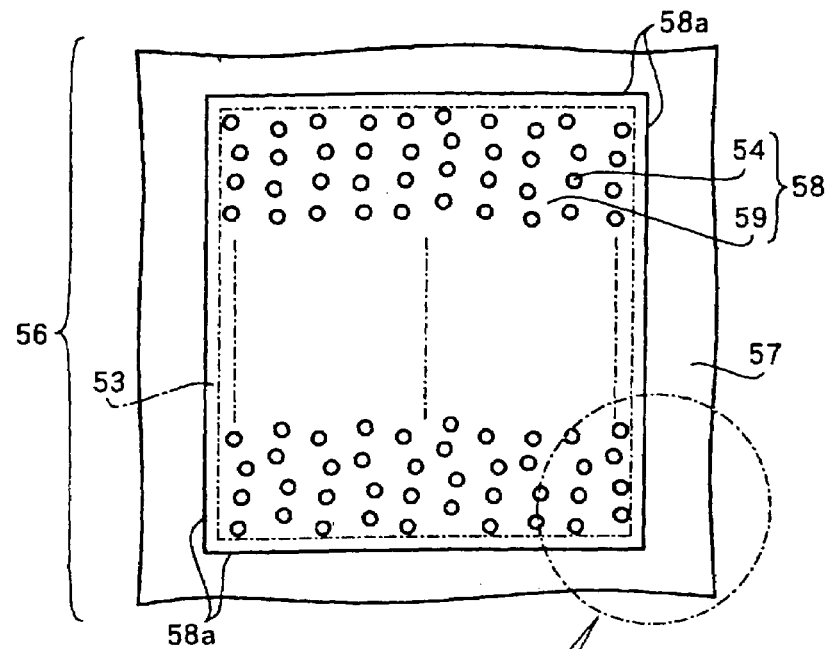
FIG. 10A is a plan view illustrating a mask according to the first embodiment of the present invention.
Figure 10B:
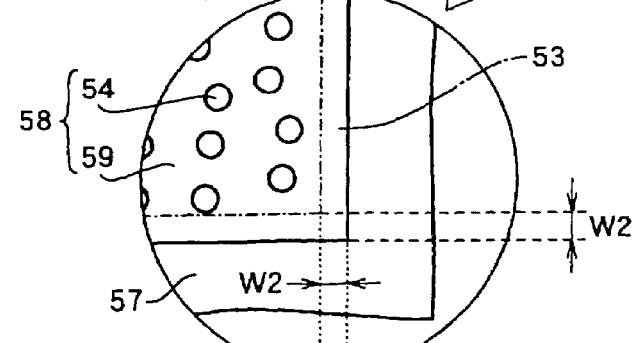
FIG. 10B illustrates an enlargement of a part of the mask.
Figure 10C:
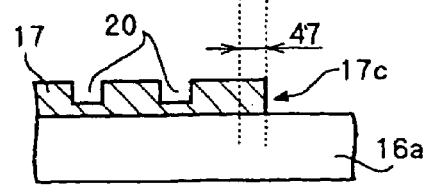
FIG. 10C is a cross-sectional view illustrating the construction of a substrate manufactured by using the mask.

According to the present embodiment, as illustrated in FIG. 6, the region 47 where the concave portions 20 do not exist is disposed in the outer circumference of the resin layer 17. Therefore, as illustrated in FIG. 10C, the region close to the edge 17c of the resin layer 17 is firmly fixed to the first substrate 16a by the thick portion. Therefore, it is possible to prevent the resin layer 17 from being separated from the first substrate 16a. When the width W1 of the region 47 where the concave portions 20 do not exist, that is, the convex portion region 47 is 4 µm to 12 µm in the resin layer 17 illustrated in FIG. 6, it is possible to firmly fix the resin layer 17 to the first substrate 16a without the resin layer 17 being separated from the first substrate 16a.

A-2 Method of Manufacturing an Electro-Optical Device

A method of manufacturing a substrate for an electro-optical device according to the present embodiment and a mask using the manufacturing method will now be described.

Figure 7:
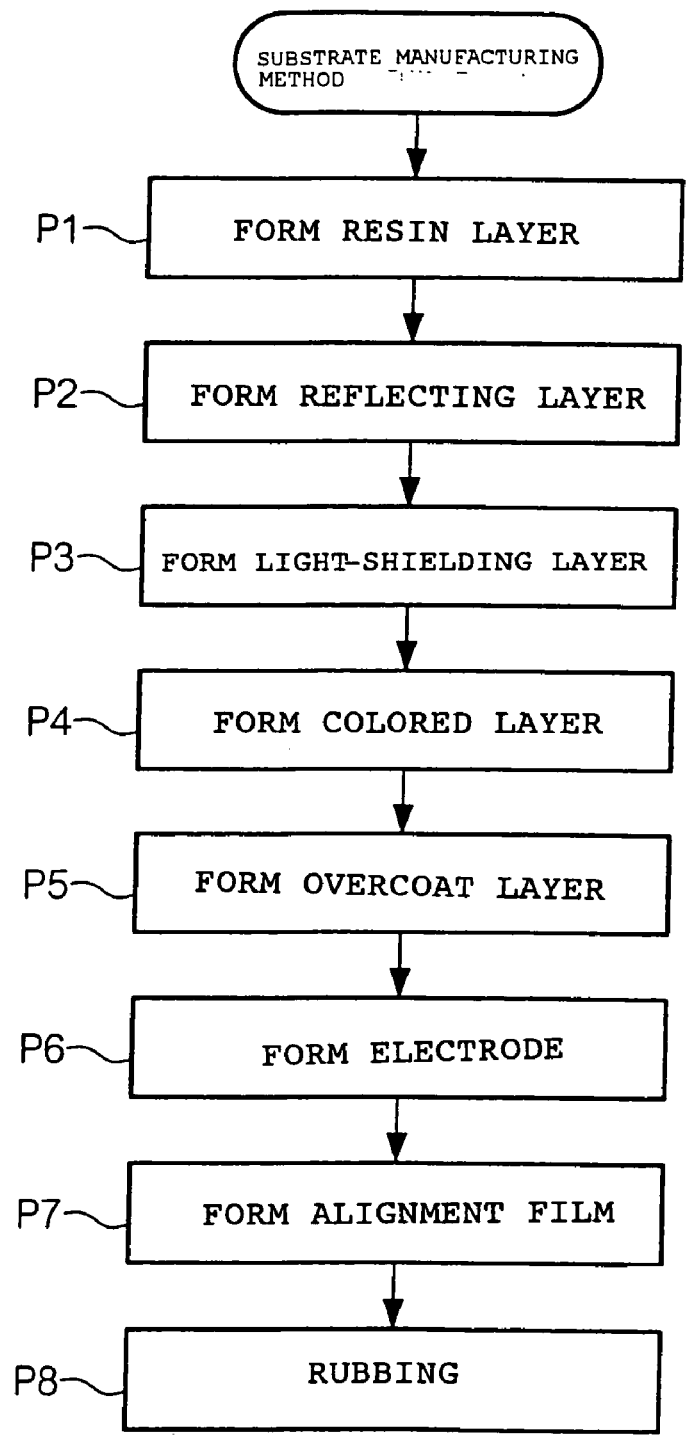
FIG. 7 is a flowchart illustrating an example regarding a method of manufacturing a substrate for an electro-optical device according to the first embodiment of the present invention.

FIG. 7 illustrates an embodiment of the method of manufacturing the substrate for the electro-optical device according to the present embodiment. According to the present embodiment, the method is used for manufacturing the color filter substrate 11 of FIG. 1. According to the manufacturing method, the resin layer 17 of FIG. 1 is formed in the step P1 of FIG. 7. As illustrated in FIGS. 2 and 4, the resin layer 17 is formed by laminating a second layer 17b on a first layer 17a. The surface becomes smooth by forming rough concave portions and rough convex portions on the surface of the first layer 17a and laminating the thin second layer 17b on the first layer 17a; the second layer 17b is formed of the same material as the first layer 17a. Steps of forming the resin layer will now be described in detail.

The reflecting layer 18 of FIGS. 2 and 4 is formed in the step P2 of FIG. 7. To be specific, for example, the aperture 46 is formed in every dot D by coating a light reflective material such as Al and an Al alloy to have a uniform thickness and by performing a photolithography step and an etching step on the light reflective material.

The light-shielding layers 21 of FIGS. 2 and 4 are formed in the step P3 of FIG. 7. To be specific, the light-shielding layers 21 are formed in latticed regions seen from the arrow A direction in the peripheral regions of the display dots D by coating a light-shielding material such as Cr to have a uniform thickness and by performing the photolithography step and the etching step on the light-shielding material.

Next, the colored layer 19 of FIGS. 2 and 4 is formed in the step P4 of FIG. 7. To be specific, for example, a colored layer material is formed by dispersing a pigment or a dye that has a color among the three colors R, G, and B into a photosensitive macromolecular material. A desired arrangement pattern is formed of the colored layer material by performing the photolithography step on the colored layer material. The R, G, and B colored layers 19 are formed between the light-shielding layers 21 in a desired arrangement pattern, for example, in a stripe pattern by performing the same step on the different two colors among R, G, and B by one color.

Next, the overcoat layers 22 of FIGS. 2 and 4 are formed in the step P5 of FIG. 7. To be specific, the aperture 28 is formed in each display dot D by coating the photosensitive resin such as acryl resin and polyimide resin to have a uniform thickness and by performing the photolithography step on the photosensitive resin.

Next, the data lines 23a of FIGS. 2 and 4 are formed in the step P6 of FIG. 7. To be specific, a plurality of straight data lines 23a is formed by the photolithography step and the etching step to be parallel to each other, that is, in a stripe seen from the arrow A direction of FIG. 1.

The alignment film 24a of FIGS. 2 and 4 is formed in the step P7 of FIG. 7. To be specific, the alignment film 24a is formed by coating a polyimide solution and post baking the polyimide solution. Furthermore, an alignment step, for example, a rubbing step is performed on the alignment film 24a in the step P8 of FIG. 7. The alignment of the liquid crystal molecules of the liquid crystal layer 14 around the color filter substrate 11 is determined.

The color filter substrate 11 of FIG. 1 is manufactured by the above method. The retardation film 26a or the polarizer 27a is attached to the outer surface of the first substrate 16a after attaching the counter substrate 12 to the color filter substrate 11 by the sealant 13.

In the method of manufacturing the color filter substrate, steps of forming the resin layer of the step P1 will now be described in detail. A photosensitive resin material 17a', for example, a PC 405G is formed on the first substrate 16a to have a uniform thickness in the step P11 of FIG. 8 as illustrated in FIG. 9A. A solvent is evaporated by pre-baking the solvent at a temperature of 100° C. for 155 seconds in the step P12.

Figure 9A:
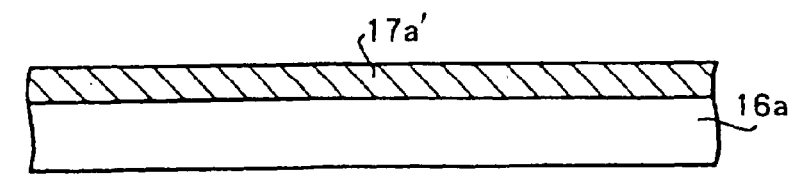
FIGS. 9A to 9E illustrate the changing states in a construction of a substrate, corresponding to the flowchart of the method of manufacturing the substrate for the electro-optical device.
Figure 9B:
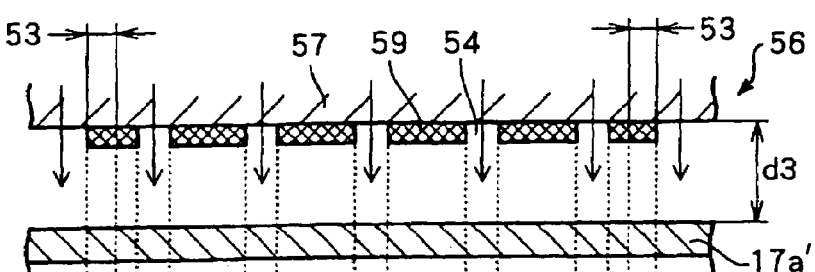

An exposure step is performed using a mask 56 in the step P13 as illustrated in FIG. 9B. As illustrated in FIG. 10A, the mask 56 is formed by disposing a light-shielding layer 58 on a light transmitting substrate 57 formed of light transmitting glass and light transmitting plastic to have a rectangular shape, a square shape, and other desired shapes. The light-shielding layer 58 is formed of convex-portion patterns 59 formed of the light-shielding material such as Cr and concave-portion patterns 54 formed of a plurality of holes, for example, regular polygonal holes irregularly formed in appropriate positions of the convex-portion patterns 59.

The concave-portion patterns 54 are for forming the concave portions 20 on the surface of the resin layer 17 in FIG. 10C. The convex-portion patterns 59 are for preventing the concave portions 20 from being formed on the resin layer 17. In FIGS. 10A, 10B and 10C, the concave-portion patterns 54 and the concave portions 20 are exaggerated and schematized for clarity. In FIG. 10A, the concave-portion patterns 54 in the center of the light-shielding layer 58 are omitted.

The edge 58a of the light-shielding layer 58 is the edge of the convex-portion patterns 59. A frame-type region 53 where the concave-portion patterns 54 do not exist is disposed along the edge 58a in the outer circumference of the light-shielding layer 58. Therefore, the concave-portion patterns 54 do not intersect with the edge 58a of the convex-portion patterns 59. The edge 58a of the convex-portion patterns 59 is positioned outside of all of the concave-portion patterns 54. The width W2 of the frame-type region 53 is set as, for example, 4 µm to 7 µm.

Figure 8:
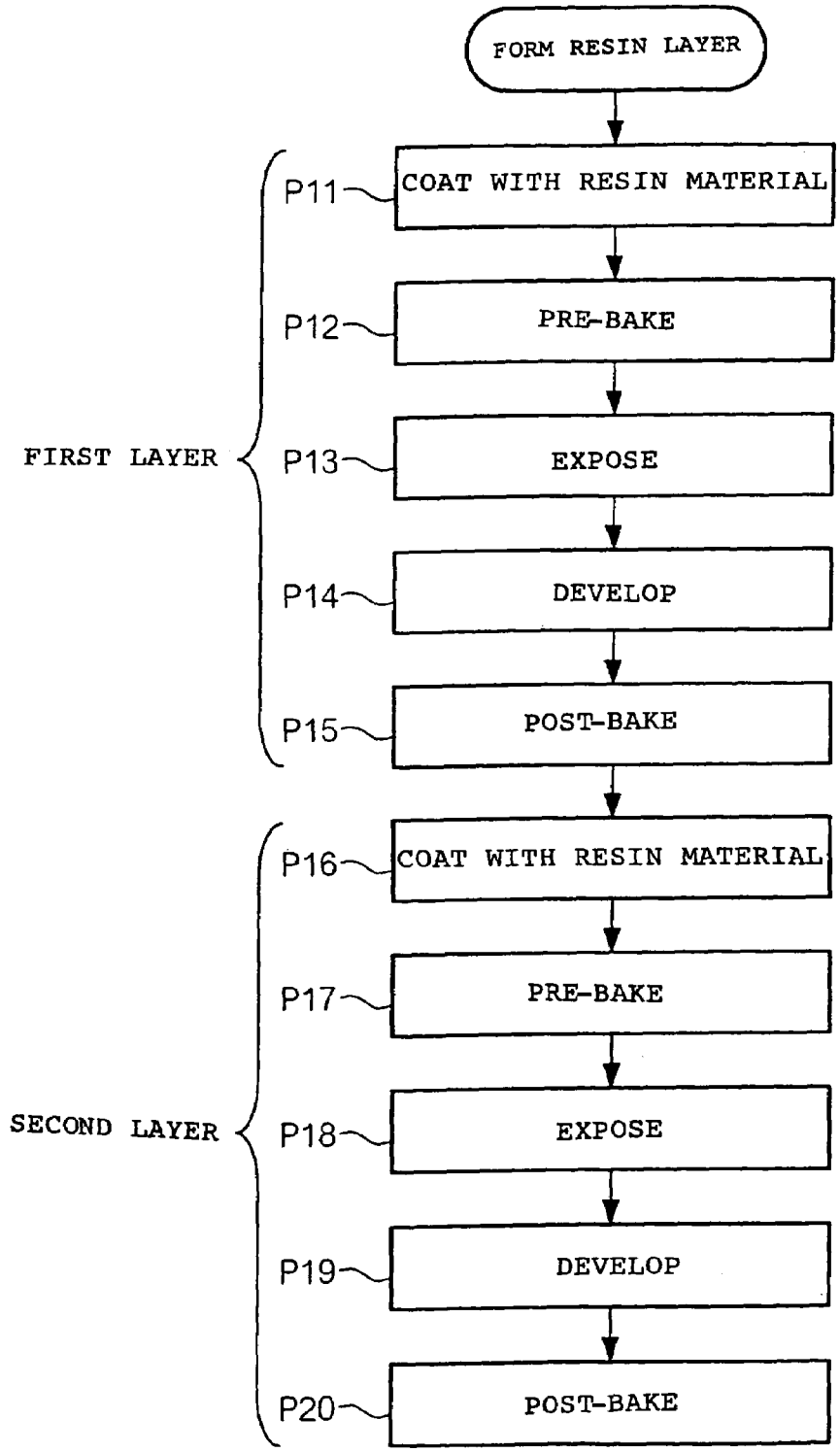
FIG. 8 is a flowchart illustrating an example regarding a step of forming a resin scattering layer, which is a main step of the method of manufacturing the substrate for the electro-optical device.

The mask 56 is separated from the resin material 17a' to be exposed by a relatively small distance d3 of 60 µm to 100 µm in the exposure step of the step P13 of FIG. 8 as illustrated in FIG. 9B. Exposure light is irradiated into the resin material 17a' through the concave-portion patterns 54 of the mask 56. According to the present embodiment, a positive photosensitive material is used as the resin material 17a'. Therefore, the exposed portion is solved by a developer.

Figure 9C:
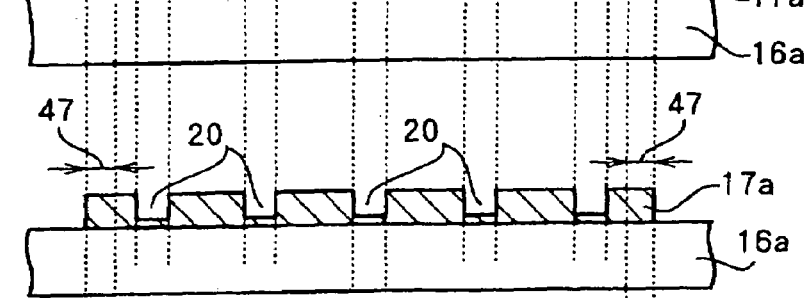

The developer is sprayed to the resin material 17a' in the step P14 of FIG. 8. Therefore, as illustrated in FIG. 9C, the exposed portion is solved, thereby to form the concave portions 20 and the first layer 17a of the resin layer 17. The concave portions 20 have angled portions and the concavo-convex portions on the surface thereof are rough. The frame-type region 53 where the concave-portion patterns 54 do not exist is provided in the outer circumference of the mask 56 according to the present embodiment. Therefore, the thick region 47 where the concave portions 20 do not exist is formed in the outer circumference of the first layer 17a formed by development. When locally thin portions are not formed in the outer circumference of the first layer 17a, it is possible to prevent the edge of the first layer 17a from being separated from the first substrate 16a though the developer is sprayed to the resin material 17a' and external force is applied to resin material 17a' in the development step P14.

The first layer 17a is stabilized by post-baking the first layer 17a at the temperature of 220° C. and for 50 minutes in the step P15 of FIG. 8. As a result, the first layer 17a of the resin layer 17 is completed.

Figure 9D:
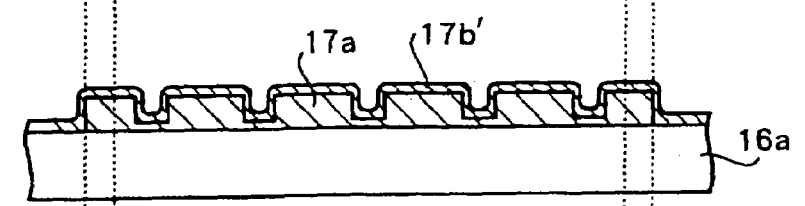
Figure 9E:
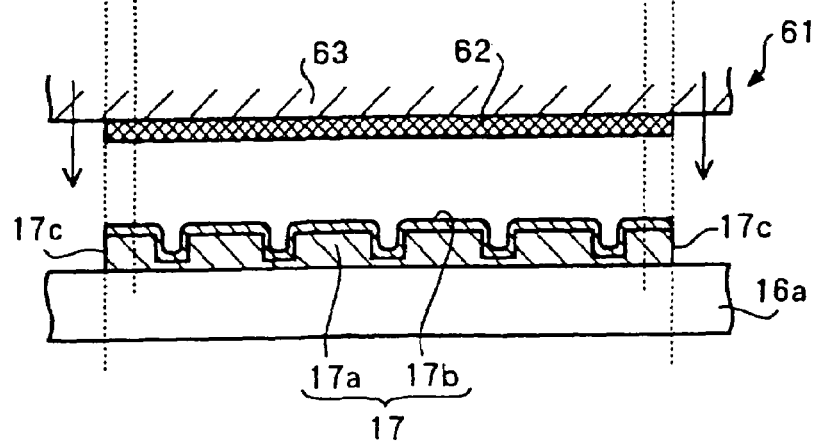

A resin material 17b' the same as the first layer 17a is coated to be thinner than the first layer 17a in the step P16 as illustrated in FIG. 9D. The resin material 17b' is pre-baked at the temperature of 100° C. for 155 seconds in the step P17. Exposure is performed using a mask 61 in the step P18 as illustrated in FIG. 9E. The mask 61 is formed by disposing a light-shielding layer 62 corresponding to the size of the resin layer 17 on a light transmitting substrate 63.

The exposure light is irradiated from the outer circumference of the light-shielding layer 62 into the resin material 17b' in the step P18. The second layer 17b is formed by developing the resin material 17b' in the step P19, thereby removing the unnecessary resin material 17b' in the outer circumference of the light-shielding layer 62 and to form the edge 51 as illustrated in FIG. 9E. The second layer 17b is post-baked at the temperature of 220° C. for 50 minutes in the step P20. As a result, the resin layer 17 is completed. It is possible to control the concave-convex portions on the surface of the resin layer 17 to a desired smoothness by laminating the second layer 17b. Even if the development step is performed in the step P19 during the formation of the second layer 17b, the thin portions do not exist in the frame-type region 47 in the outer circumference of the first layer 17a. Therefore, the first layer 17a is not separated from the first substrate 16a.

A-3 Another Embodiment of a Method of Manufacturing an Electro-Optical Device>

FIG. 11 illustrates steps of forming a resin layer according to another embodiment of a method of manufacturing a substrate for an electro-optical device according to the present invention. The steps replace the steps of forming the resin layer as illustrated in FIG. 8 and are applied to the step P1 of the method of manufacturing the substrate as illustrated in FIG. 7.

In the aforementioned method illustrated in FIG. 8, as illustrated in FIG. 2, the resin layer 17 is formed of the first layer 17a and the second layer 17b. According to the present embodiment illustrated in FIG. 11, as illustrated in FIG. 12C, the resin layer 17 is formed by one layer. In order to make the surface of the resin layer 17 smooth even if the resin layer 17 is formed of a single layer, according to the present embodiment, the following change is made to the exposure step P33 of FIG. 11.

In the aforementioned method illustrated in FIG. 8, the distance d3 between the mask 56 and the resin material 17a' is made to be small, ranging from 60 μm to 100 μm in the exposure step P13 as illustrated in FIG. 9C. The distance d4 between the mask 56 and the resin material 17a' is relatively large in the range of 150 μm to 200 μm in the exposure step P33 illustrated in FIG. 11 as illustrated in FIG. 12B.

In FIG. 11, the other steps, that is, the step P31 of coating the resin material, the step P32 of pre-baking the resin material, the step P34 of developing the resin material, and the step P35 of post-baking the resin material are the same of the corresponding steps for forming the first layer in FIG. 8. Therefore, the description thereof will be omitted.

Figure 12A:
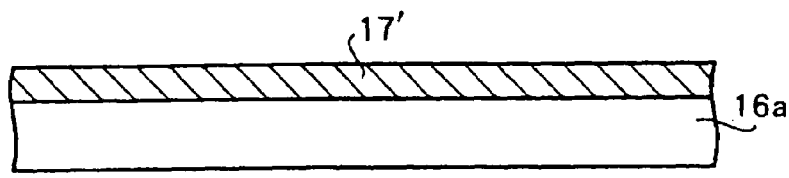
FIGS. 12A to 12C illustrate the changing states in a construction of a substrate, corresponding to the flowchart according to the modification.
Figure 12B:
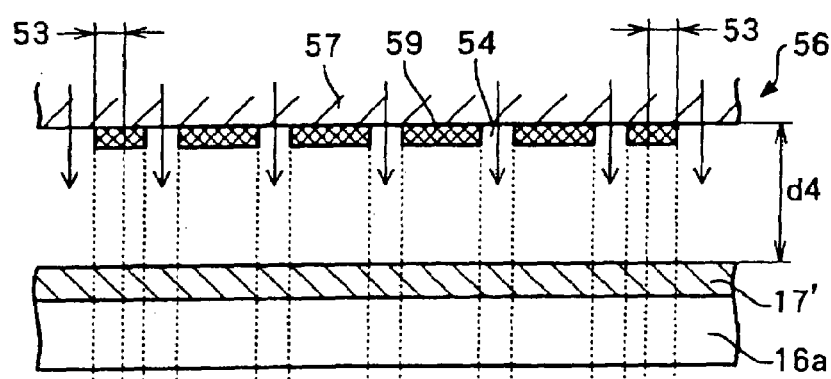
Figure 12C:
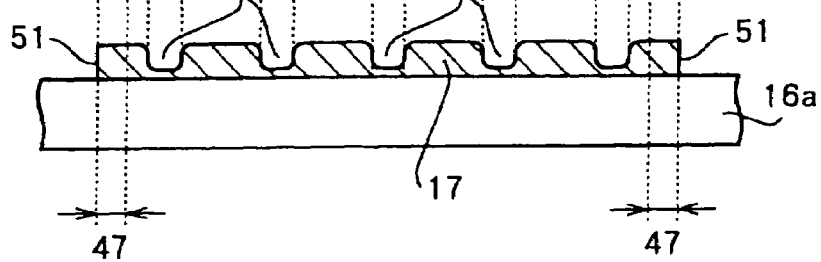

According to the present embodiment, as illustrated in FIG. 12(b), the frame-type region 53, where the concave-portion patterns 54 do not exist, is disposed in the outer circumference of the mask 56. Therefore, the frame-type region 47, where the concave portions 20 do not exist, can be formed in the outer circumference along the edge 51 of the resin layer 17. Therefore, it is possible to prevent the resin layer 17 from being separated from the first substrate 16a.

B. SECOND EMBODIMENT

A second embodiment of the present invention will be described with reference to the drawings. A color display liquid crystal device of an active matrix method will be described as an example of an electro-optical device according to the present embodiment.

B-1 Electro-Optical Device

Figure 13:
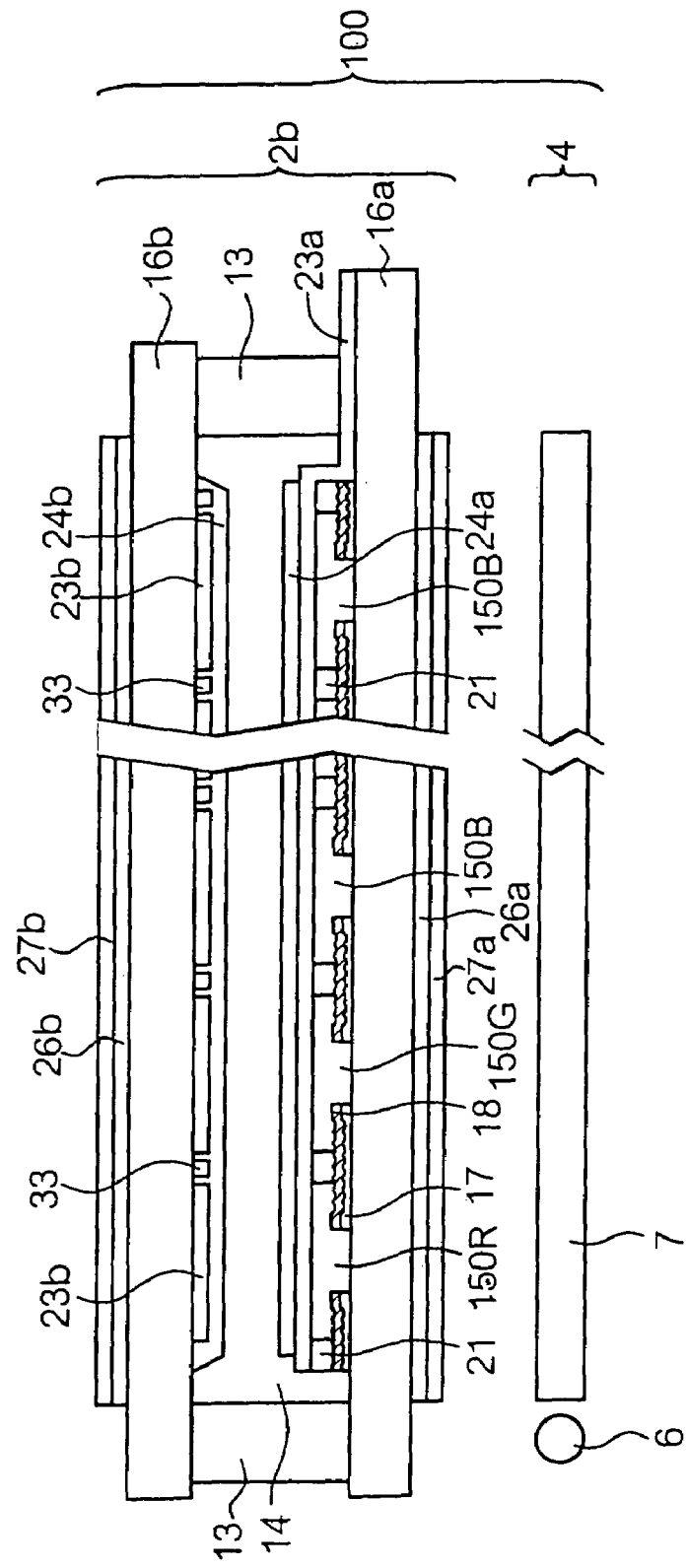
FIG. 13 is a cross-sectional view of a liquid crystal device according to a second embodiment of the present invention.

A structure of a liquid crystal device according to the present embodiment will now be described. FIG. 13 is a cross-sectional view of the liquid crystal device according to the present embodiment. FIG. 14 is an exploded perspective view illustrating a schematic structure of the liquid crystal device. FIG. 13 is a cross-sectional view taken along the line XIII—XIII in FIG. 14.

As illustrated in FIGS. 13 and 14, a liquid crystal device 100 includes a liquid crystal panel 2b that interposes a liquid crystal 14 (not illustrated in FIG. 14) between the second substrate 16b and the first substrate 16a. A lighting system 4 is disposed on the side of the first substrate 16a of the liquid crystal panel 2b. Hereinafter, the side of the second substrate 16b (the upper side of the drawing) with respect to the liquid crystal 14 is referred to as an observer side, which is the side where an observer is positioned to recognize images that the liquid crystal device 100 displays. The side of the first substrate 16a (the lower side of the drawing) seen from the liquid crystal 14 is referred to as the rear side.

The lighting system 4, a light source 6, and a light guider 7 are the same as illustrated in the first embodiment. In FIG. 2, though not illustrated, like in the first embodiment, a diffusion plate uniformly diffuses light from the light guider 7 to the liquid crystal panel 2b and is attached to the surface of the light guider 7, which faces the liquid crystal panel 2b. A reflecting plate for reflecting the light emitted from the light guider 7 to the rear side to the side of the liquid crystal panel 2b is attached to the opposite surface.

In the liquid crystal panel 2b, the second substrate 16b is a plate-shaped member formed of a light transmitting material such as glass. A retardation film 26b (not illustrated in FIG. 14) for improving contrast and a polarizer 27b (not illustrated in FIG. 14) for polarizing incident light are sequentially stacked on the observer side surface of the second substrate 16b from the side of the second substrate 16b. The pixel electrodes 23b formed of an ITO film are arranged in a matrix on the surface of the second substrate 16b on the side of the liquid crystal 14 (on the rear side). A plurality of scanning lines 33 extended to one direction (the Y direction illustrated in FIG. 14) is formed in the gaps between the pixel electrodes 23b.

As illustrated in FIG. 14, the pixel electrodes 23b and the scanning lines 33 adjacent to the pixel electrodes 23b are connected to each other through the TFD 31. The TFD 31 is a double-terminal switching element having a non-linear current-voltage characteristic. As illustrated in FIG. 13, the surface of the second substrate 16b, where the pixel electrodes 23b, the scanning lines 33, and the TFDs 31 are formed, is covered with the alignment film 24b (not illustrated in FIG. 14). The alignment film 24b is formed of an organic material such as polyimide. The rubbing step for controlling the alignment state of the liquid crystal 14 when no voltage is applied is performed on the alignment film 24b.

On the other hand, the first substrate 16a is a plate-shaped member made of the light transmitting material such as glass. The retardation plate 26a (not illustrated in FIG. 14) and the polarizer 27a (not illustrated in FIG. 14) are sequentially stacked on the rear side of the first substrate 16a from the side of the first substrate 16a like in the second substrate 16b. The resin layer 17, that is the base layer, the reflecting layer 18, any one of the three color filters 150R, 150G, and 150B, the data line 23a, and the alignment film 24a (not illustrated in FIG. 14) are sequentially stacked on the liquid crystal 14 side (observer side) of the first substrate 16a from the first substrate 16a.

The alignment film 24a is an organic thin film formed of polyimide. The rubbing step for controlling the alignment direction of the liquid crystal 14 when no voltage is applied is performed on the alignment film 24a. A plurality of data lines 23a is band-shaped electrodes formed of a light transmitting conductive material such as the ITO and is formed on the surfaces of the color filters 150R, 150G, and 150B. As illustrated in FIG. 14, the data lines 23a extend to the direction (the X direction in FIG. 14) that intersects with the scanning lines 33 and face a plurality of pixel electrodes 23b that makes columns on the second substrate 16b. The alignment direction of the liquid crystal 14 interposed along the second substrate 16b and the first substrate 16a changes in accordance with the voltage applied to between the pixel electrodes 23b and the data lines 23a which face the pixel electrodes 23b. As illustrated in FIG. 14, the dots D that are the minimal units of the regions, where the alignment direction of the liquid crystal 14 changes in accordance with the applied voltage are arranged in a matrix. Each of the dots D functions as a sub-pixel.

The color filters 150R, 150G, and 150B are resin layers disposed corresponding to the respective dots D as illustrated in the first embodiment. The color filters 150R, 150G, and 150B are colored by a pigment to designate the red (R), green (G), and blue (B) colors and selectively transmit light components having the wavelengths corresponding to the colors. In FIG. 14, R, G, and B denote the dots D where the color filters 150R, 150G, and 150B are arranged. The light-shielding layer 21 is latticed in order to fill the gaps among the color filters 150R, 150G, and 150B. The light-shielding layer 21 shields the light from the sides of the adjacent color filters 150R, 150G, and 150B. The light-shielding layer 21 is as described in the first embodiment.

Figure 15:
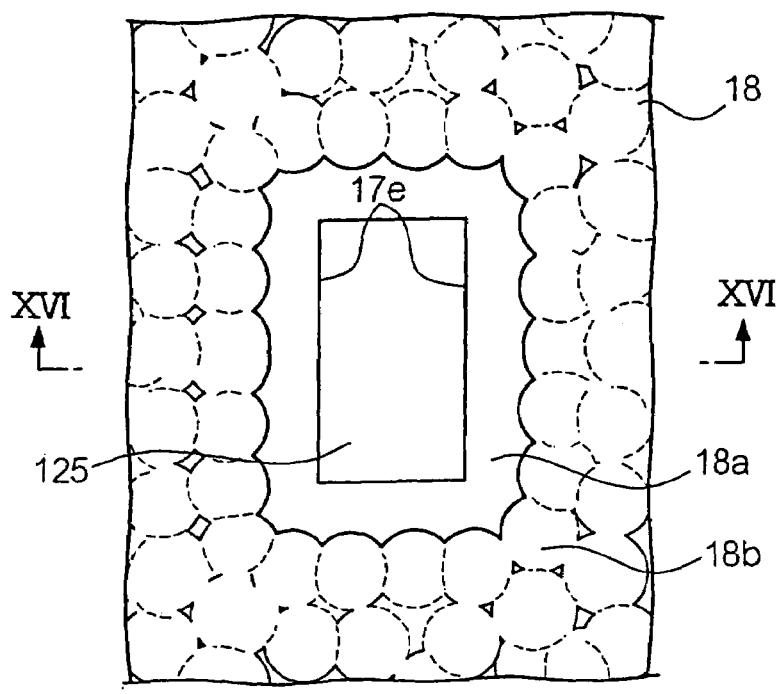
FIG. 15 is a plan view of a transflective substrate included in the liquid crystal device according to the second embodiment of the present invention.
Figure 16:
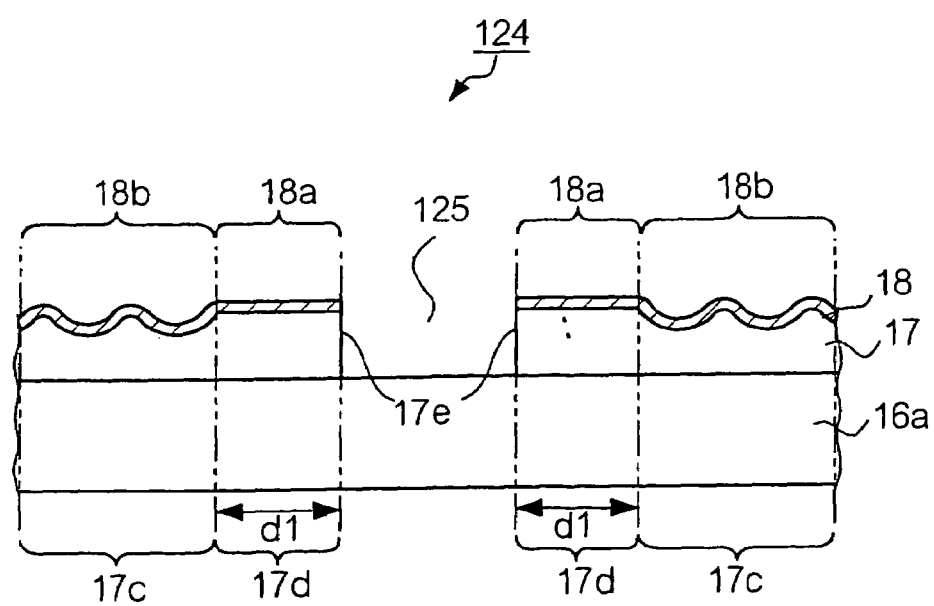
FIG. 16 is a cross-sectional view of the transflective substrate included in the liquid crystal device according to the second embodiment of the present invention.

FIG. 15 is a top view of the reflecting layer 18 corresponding to one dot D. FIG. 16 is a partial sectional view of the first substrate 16a, the resin layer 17, and the reflecting layer 18 corresponding to the dot D. In FIG. 16, the resin layer 17 is formed by exposing and developing the photosensitive material to have an aperture 125 for transmitted light, which is positioned in the center of the dot D with smooth concavo-convex shaped surfaces 17c disposed on the observer side (concavo-convex surfaces). The concavo-convex surfaces 17c are separated from the edges (the sidewall surfaces) 17e of the aperture 125 by a uniform distance d21 (for example, 4 μm). Flat surfaces 17d are included between the aperture 125 and the concavo-convex surfaces 17c. In the resin layer 17, the sidewall surfaces 17e that form the aperture 125 are flat and will be described later.

As illustrated in FIGS. 15 and 16, the reflecting layer 18 is formed of a light reflective material such as Al as a thin film with a uniform thickness on the observer side surface of the resin layer 17. The shape of the surface of the reflecting layer 18 reflects the shape of the surface of the resin layer 17. To be specific, the reflecting layer 18 includes smooth concavo-convex shaped light reflecting portions 18b (hereinafter, referred to as diffuse reflecting surfaces) and flat portions 18a (hereinafter, referred to as mirror-shaped reflecting surfaces) interposed between the diffuse reflecting surfaces 18b and the edge of the aperture 125.

In accordance with the above structure, in the reflecting layer 18, the light emitted from the lighting system 4 (refer to FIG. 13) passes through the aperture 125 of the resin layer 17 and the reflecting layer 18, and is emitted to the observer side. The external light incident from the observer side is reflected to the mirror-shaped reflecting surfaces 18a and the diffuse reflecting surfaces 18b. The diffuse reflecting surfaces 18b diffuse and reflect the external light. For the convenience of explanation, a substrate for an electro-optical device having transflective property, which includes the first substrate 16a, the resin layer 17, and the reflecting layer 18, is referred to as a transflective substrate 124.

The second substrate 16b and the first substrate 16a mentioned above are attached to each other by the sealant 13 as illustrated in FIG. 13. The twisted nematic (TN) type liquid crystal 14 is sealed in a region surrounded by structures on both substrates and the sealant 13. When the external light is incident on the liquid crystal panel 2b from an observer side, the external light is diffuse reflected by the transreflecting substrate 124 toward the observer side. As a result, reflective display is realized. The light of the lighting system 4 incident from the rear side of the liquid crystal panel 2b passes through the aperture 125 of the resin layer 17 and the reflecting layer 18, and is emitted to the observer side. As a result, transmissive display is realized.

B-2 Method of Manufacturing an Electro-Optical Device

A method of manufacturing the liquid crystal device 100 according to the present embodiment will now be described. Hereinafter, a method of manufacturing the transflective substrate 124 in the liquid crystal device 100 will be described in detail. A description of a method of manufacturing structures other than the transflective substrate 124 in the liquid crystal device 100 will be omitted.

Figure 17:
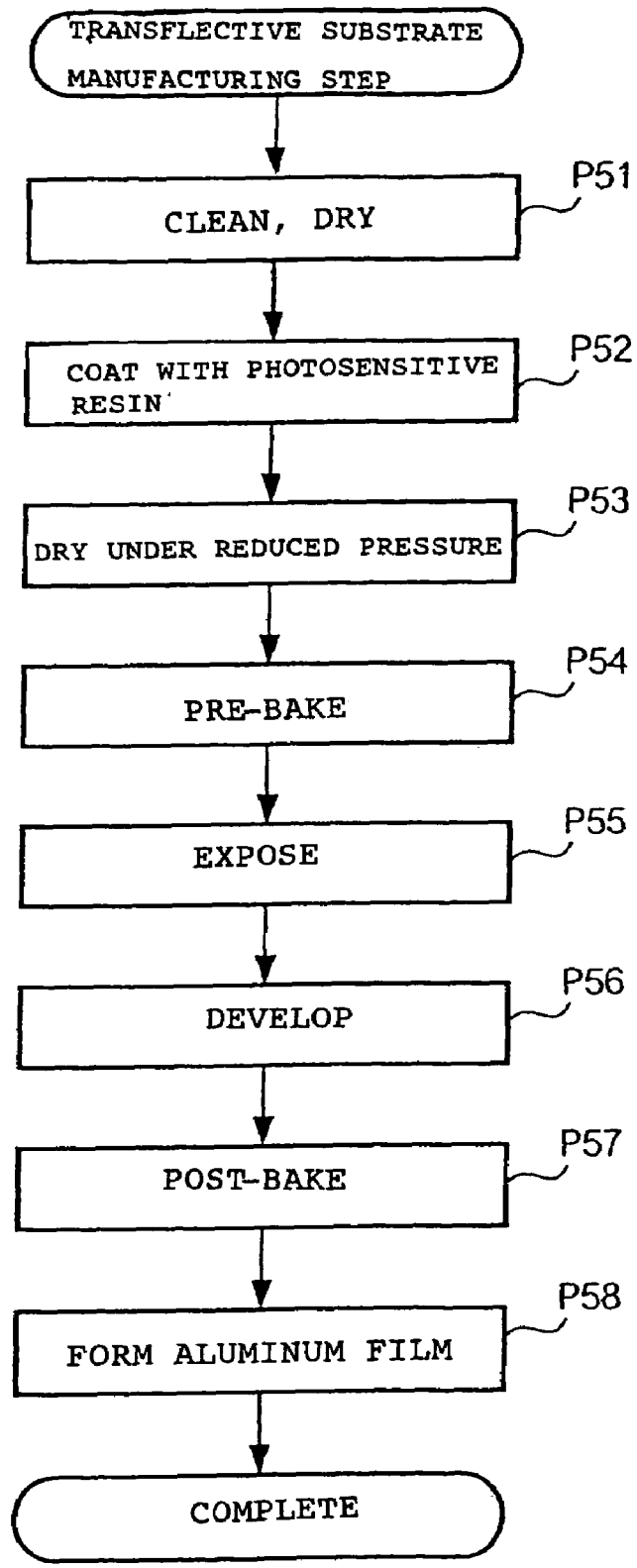
FIG. 17 is a flowchart illustrating a method of manufacturing the transflective substrate according to the second embodiment of the present invention.

FIG. 17 is a flowchart illustrating steps of manufacturing the transflective substrate 124. FIG. 18 is a partial sectional view of the first substrate 16a, which illustrates the contents of the manufacturing steps. FIG. 18 illustrates a portion corresponding to a dot D in the first substrate 16a. The manufacturing steps include steps of forming the resin layer 17 on the first substrate 16a using a photosensitive material and forming the reflecting layer 18 on the surface of the resin layer 17. To be specific, the manufacturing steps are as follows.

Figure 18A:
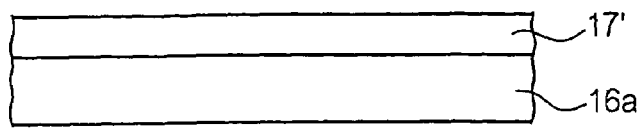
FIGS. 18A to 18F illustrate states in the respective steps of the method of manufacturing the transflective substrate according to the second embodiment of the present invention.

After cleaning the first substrate 16a, the first substrate 16a is dried (P51 in FIG. 17). As illustrated in FIG. 18A, the observer side surface of the first substrate 16a is coated with a positive photosensitive resin 17' which is a kind of the photosensitive material, by a spin coating method (P52 in FIG. 17). For example, PC 405G (manufactured by JSR Corporation) is very suitable for the photosensitive resin 17'. The photosensitive resin 17', with which the first substrate 16a is coated, is dried under reduced pressure circumstances (P53). The dried photosensitive resin 17' is pre-baked at the temperature in the range of 100° C. to 105° C. (P54 in FIG. 17).

Figure 19:
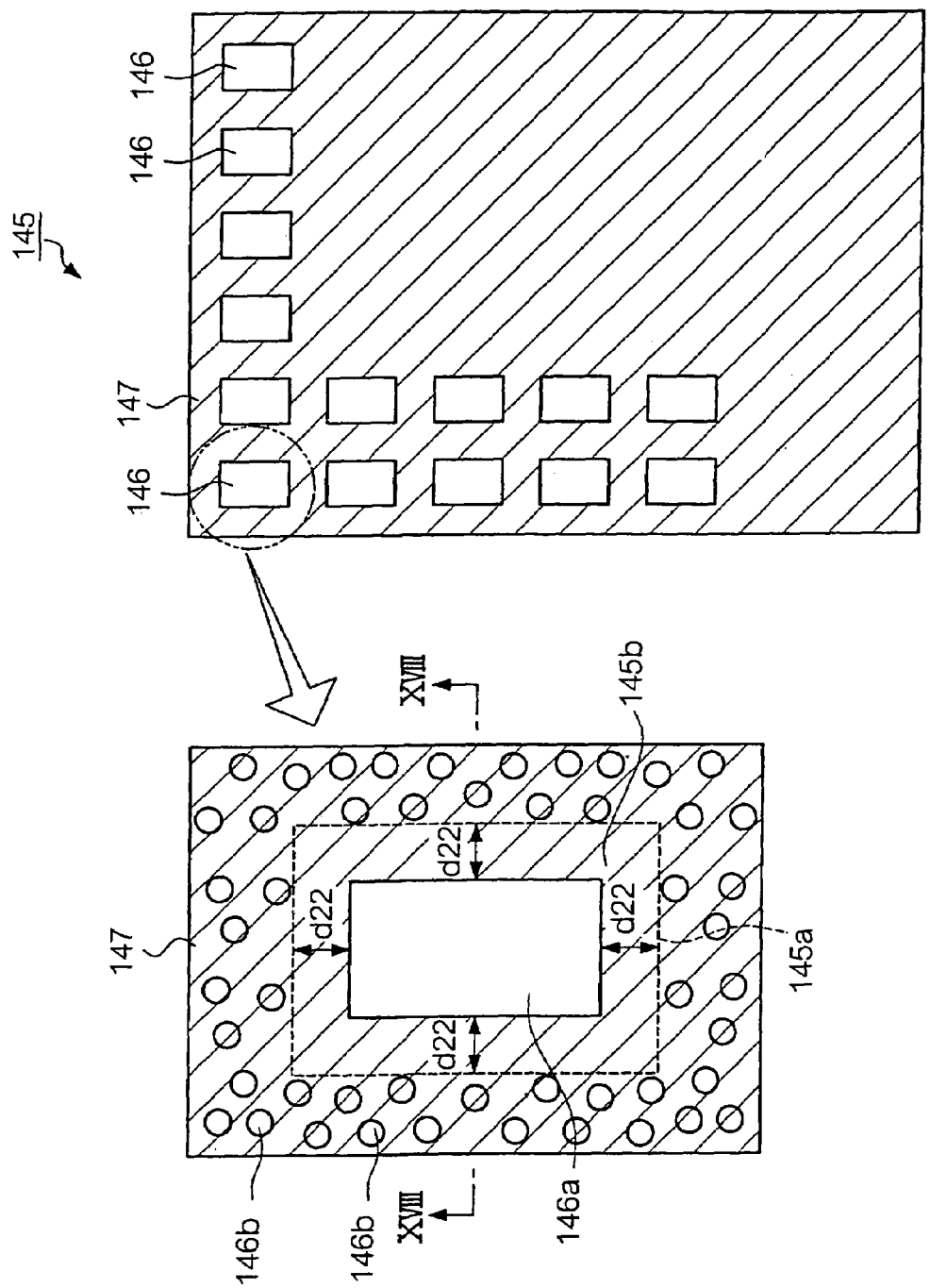
FIG. 19 is a plan view illustrating a mask used for manufacturing the transflective substrate according to the second embodiment of the present invention.

The pre-baked photosensitive resin 17' is exposed using a mask (P55 in FIG. 17). FIG. 19 illustrates patterns of a mask 145 used for exposing the photosensitive resin 17'. As illustrated in FIG. 19, the mask 145 is obtained by patterning a light-shielding layer 147, such as Cr marked with oblique lines, on a light transmitting substrate 146 such as glass. The mask 145 corresponds to each dot D in the liquid crystal panel 2b. In the mask 145, the same patterns are arranged in a matrix. Therefore, a region corresponding to a dot D in the mask 145 will now be described.

As illustrated in an enlargement of FIG. 19, the region corresponding to a dot D in the mask 145 includes two kinds of light transmitting portions (portions where the light-shielding layer 147 is not provided) for forming the resin layer 17, that is, a rectangular aperture light transmitting portion 146a disposed in the center and a plurality of concavo-convex light transmitting portions 146b disposed around the light transmitting portion 146a. The aperture light transmitting portion 146a for forming the aperture 125 of the resin layer 17 is a transmitting region for irradiating light into a portion corresponding to the aperture 125 in the pre-baked photosensitive resin 17'. Since the photosensitive resin 17' is positive, when light is irradiated, the portion is dissolved by a developer and thereby being removed during the following development step.

A plurality of concavo-convex light transmitting portions 146b consists of minute transmitting regions for forming the concavo-convex surfaces 17c of the resin layer 17, and are dispersed in a region separated from the edge of the aperture light transmitting portion 146a by the distance of d22 or more. That is, in the mask 145, when a boundary line 145a that is spaced apart from the edge of the aperture light transmitting portion 146a to outside is provided, the region, excluding the aperture light transmitting portion 146a in the region surrounded by the boundary line 145a, is completely shielded from light. The region 145b, which is completely shielded from light, is included in order to secure the flat surfaces 17d of the resin layer 17 and is referred to as a flat surface forming region.

Figure 18B:
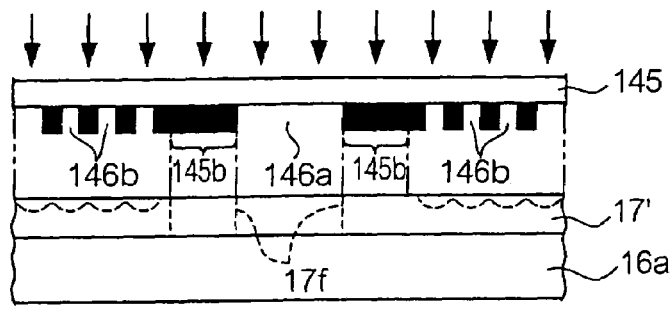

When the photosensitive resin 17' is exposed using the mask 145, as illustrated in FIG. 18B, the light that passes through the concavo-convex light transmitting portions 146b of the mask 145 reaches regions corresponding to the concavo-convex portions 17c of the resin layer 17 on the top surface of the photosensitive resin 17' in a state where the intensity thereof is irregular. Therefore, in the photosensitive resin 17', light operates on the smooth concavo-convex surface as illustrated by a dashed line. Irregularity in intensity caused by the transmitted light of the concavo-convex light transmitting portions 146b can be controlled by controlling the gap between the mask 145 and the photosensitive resin 17' and the shapes (the sizes) and the number of concavo-convex light transmitting portions 146b.

The light that passes through the aperture light transmitting portion 146a reaches the portion corresponding to the aperture 125 in the photosensitive resin 17'. The light operates on the lower most portion of the photosensitive resin 17'. The flat surface forming region 145b is included in the mask 145. Therefore, the light that passes through the aperture light transmitting portion 146a and the light that passes through the concavo-convex light transmitting portions 146b reach the photosensitive resin 17' without interfering with each other. Light is not irradiated into the portions corresponding to the flat surfaces 17d of the resin layer 17 in the photosensitive resin 17'. Therefore, the photosensitive resin 17' is exposed so that a boundary surface 132f between the portion where the transmitted light operates by the aperture light transmitting portion 146a and the portion where the transmitted light does not operate is almost flat.

Figure 18C:
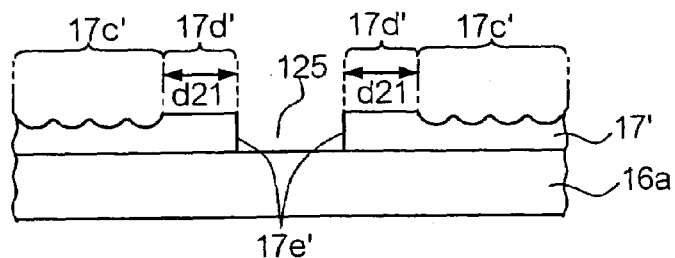

After exposing the photosensitive resin 17' using the mask 145, when the exposed photosensitive resin 17' is developed (P56 in FIG. 17), as illustrated in FIG. 18C, the photosensitive resin 17' is formed. To be specific, the photosensitive resin 17' including flat surfaces 17d', and concavo-convex surfaces 17c', and the aperture 125 is formed. The flat surface forming regions 145b for forming the flat surfaces 17d' are included in the mask 145 used during the exposure step. Therefore, in the developed photosensitive resin 17', the concavo-convex surfaces 17c' are separated from sidewall surfaces 17e' which form the aperture 125. The sidewall surfaces 17e' are flat.

As mentioned above, according to the present embodiment, the sidewall surfaces 17e' of the aperture 125 in the photosensitive resin 17' are exposed in order to be almost flat. Therefore, compared with a conventional technique, it is possible to prevent some parts of the sidewall surfaces 17e' from being separated during development. Therefore, it is possible to improve the quality of the transflective substrate 124, thereby improving the quality of the liquid crystal device 100.

It will now be described by what distance the concavo-convex surfaces 17c' are separated from the sidewall surfaces 17e' in the photosensitive resin 17' (the resin layer 17). The distance d21 between the sidewall surfaces 17e' and the concavo-convex surfaces 17c' is preferably large to secure the flatness of the sidewall surfaces 17e', and is preferably small to secure a diffuse reflecting property of the reflecting layer 18. According to the present inventor, when the distance d21 is about 4 μm or more, it is possible to secure enough flatness of the sidewall surfaces 17e'. When the distance d21 is about 12 μm or less, it is possible to secure enough diffuse reflecting property of the reflecting layer 18. Therefore, to secure both the diffuse reflecting property of the reflecting layer 18 and the flatness of the sidewall surfaces 17e', the distance d21 is preferably in the range of about 4 μm to 12 μm. The distance d21 can change by controlling the distance d22 from the edge of the aperture light transmitting portion 146a to the boundary line 145a in the mask 145 (refer to FIG. 19).

When the step of developing the photosensitive resin 17' is completed, ultraviolet (UV) rays are irradiated into the photosensitive resin 17'. The photosensitive resin 17' (PC 405G), according to the present embodiment, is yellow. The yellow color is removed and the light-transmitting property improves by irradiating UV rays. If the resin layer 17 is colored, when the external light is reflected by the transflective substrate 124, the color is reflected to the reflected light. It is an object of the present embodiment to solve this problem. The step is unique to the photosensitive resin 17', according to the present embodiment and is not essential for manufacturing the transflective substrate 124.

The photosensitive resin 17' is post-baked at the temperature of 220° C. for 50 minutes (P57 in FIG. 17). As a result, the resin layer 17 having the aperture 125 and the concavo-convex surfaces 17c is formed.

Figure 18D:
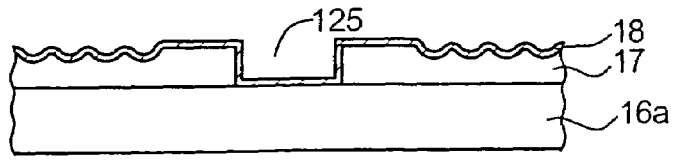
Figure 18E:
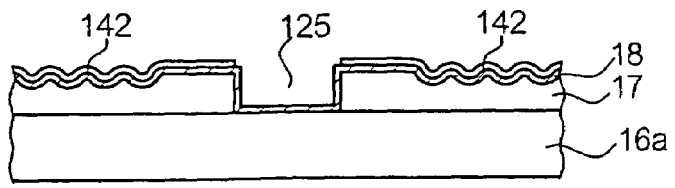
Figure 18F:
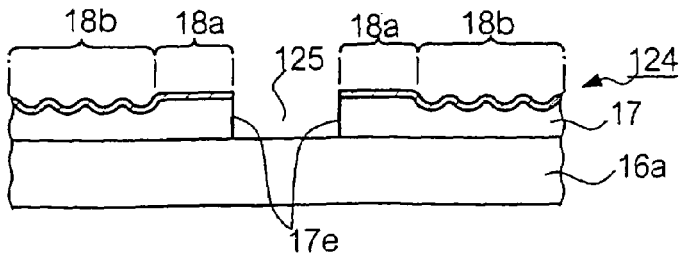

As illustrated in FIG. 18D, Al or an Al alloy that becomes the reflecting layer 18 is formed on the surface where the resin layer 17 is formed in the first substrate 16a by a spattering method to an almost uniform thickness in order to cover the resin layer 17 (P58 in FIG. 17). As illustrated in FIG. 18E, a mask 142 is formed by removing an aperture in an Al layer. To be specific, the region excluding the portion corresponding to the aperture 125 of the resin layer 17 is covered with the mask 142. When the mask 142 is removed after etching the portion that is not covered with the mask 142 in the Al layer, as illustrated in FIG. 18F, the diffuse reflective transflective substrate 124 having the aperture 125 and the concavo-convex diffuse reflecting surfaces 18b is manufactured.

A method of forming structures on the first substrate 16a where the reflecting layer 18 is formed will now be described with reference to FIG. 13. When the reflecting layer 18 is formed as mentioned above, a thin film made of Cr is formed on the reflecting surface side (the observer side) of the first substrate 16a by the spattering method. The latticed light-shielding layer 21 is obtained by patterning the thin film using a photolithography technique and an etching technique.

In the first substrate 16a, the red, green, and blue color filters 150R, 150G, and 150B are formed on the reflecting layer 18 in a matrix. The color filters 150R, 150G, and 150B are made of the photosensitive resin, are colored by a pigment as described in the first embodiment.

The data lines 23a are obtained by forming a thin film made of the ITO to cover the color filters 150R, 150G, and 150B and the light-shielding layer 21, and by patterning the thin film. The alignment film 24a is formed so as to cover the data lines 23a. A rubbing step is performed on the surface of the alignment film 24a.

The structures disposed on the first substrate 16a are manufactured as mentioned above. The first substrate 16a obtained by the manufacturing method and the second substrate 16b where the pixel electrodes 23b, the scanning lines 33, the TFDs 31, and the alignment film 24b are formed, are connected to each other through the sealant 13 in a state where the alignment film 24a and the alignment film 24b face each other. The liquid crystal 14 is implanted into a space surrounded by the substrates 16a and 16b and the sealant 13. The space, into which the liquid crystal 14 is implanted, is sealed by a sealant which is not illustrated. The retardation films 26a and 26b, and the polarizers 27a and 27b are attached to the external surfaces of the second substrate 16b and the first substrate 16a that are integrated with each other, respectively. As a result, the liquid crystal display panel is completed.

As mentioned above, according to the manufacturing method of the present embodiment, the resin pieces are not separated from the first substrate 16a while the resin layer 17 (the photosensitive resin 17') is developed. Therefore, it is possible to prevent some parts of the sidewall surfaces 17e' of the photosensitive resin 17' from being separated and to prevent the separated resin pieces from being attached to the photosensitive resin 17' again during the development step. As a result, it is possible to prevent the quality of the liquid crystal device 100 from deteriorating due to the separation of the resin layer 17 from the first substrate 16a.

The above-mentioned embodiment is an example. It is possible to provide various modifications of the above embodiment. As a modification, the following can be considered.

Figure 20:
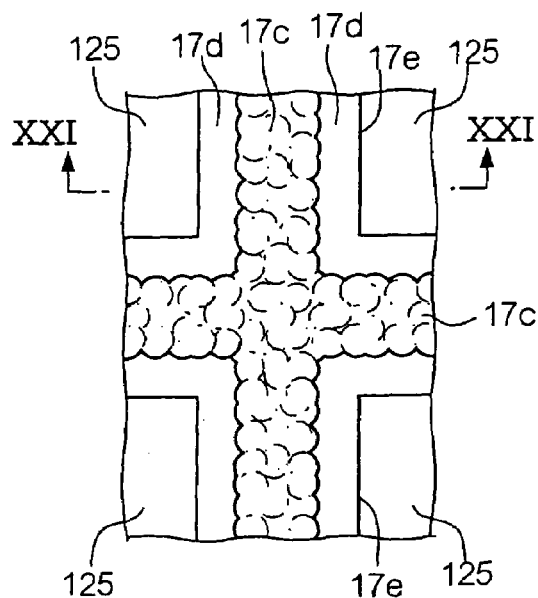
FIG. 20 is a plan view illustrating the shape of a resin layer according to a modification of the second embodiment of the present invention.
Figure 21:
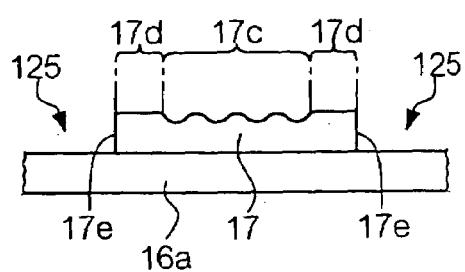
FIG. 21 is a cross-sectional view illustrating the shape of the resin layer according to the second embodiment of the present invention.
Figure 22:
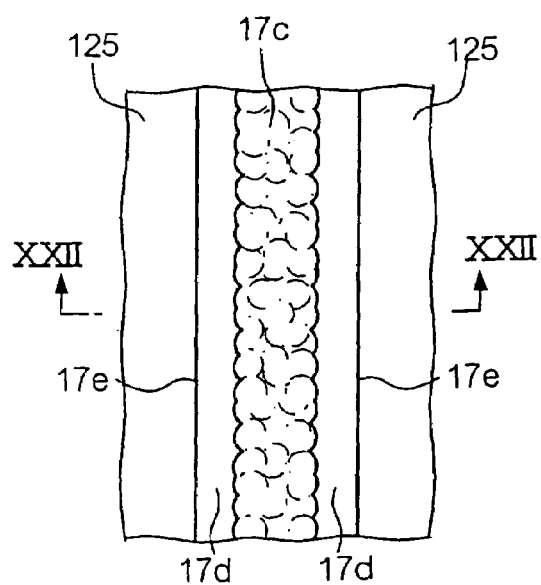
FIG. 22 is a plan view illustrating the shape of the resin layer according to another modification of the second embodiment of the present invention.
Figure 23:
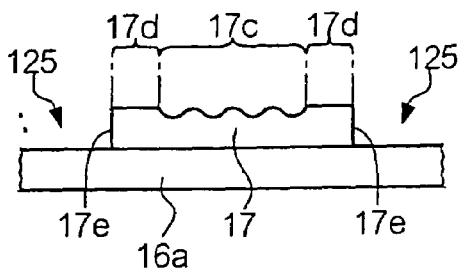
FIG. 23 is a cross-sectional view illustrating the shape of the resin layer according to the second embodiment of the present invention.

According to the above-mentioned embodiment, the aperture 125, which is formed in the resin layer 17 (the reflecting layer 18), is formed in the center of each dot D. However, the present invention is not limited thereto. For example, as illustrated in FIGS. 20 and 21, the apertures 125 may be formed in each of the four corners of the dot D. As illustrated in FIGS. 22 and 23, the apertures 125 may be formed along both sides of the dot D. In either case, the resin layer 17 is not dissolved so the sidewall surfaces 17e are flat by exposing the resin layer 17 resulting in the flat surfaces 17d to be formed along the edges of the apertures 125. As a result, the resin layer 17 (the photosensitive material) is not separated from the first substrate 16a during the development step like in the above embodiment.

Figure 24:
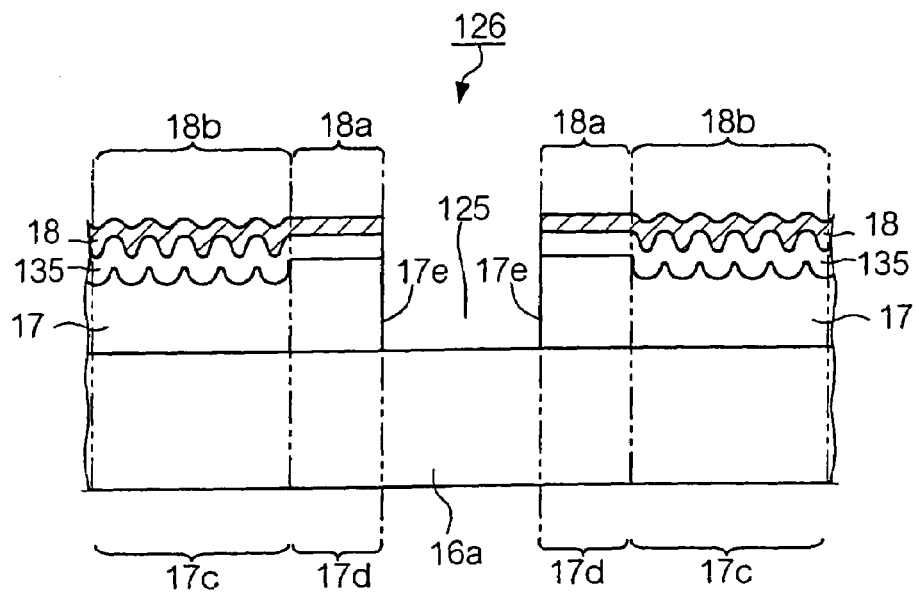
FIG. 24 is a partially sectional view of the transflective substrate according to the modification.

The transflective substrate 124 according to the present embodiment has a three-layer structure formed of the first substrate 16a, the resin layer 17, and the reflecting layer 18. However, the present invention is not limited thereto. FIG. 24 is a partial sectional view illustrating a transflective substrate 126 having a four-layer structure. In FIG. 24, an intermediate layer 135 disposed between the resin layer 17 and the reflecting layer 18 mitigates or absorbs change in the tilts of the concavo-convex surfaces 17c of the resin layer 17. When the concavo-convex surfaces 17c of the resin layer 17 are steep, it is possible to make the concavo-convex shapes gentle and to reflect the concavo-convex shapes of the resin layer 17 to the diffuse reflecting surfaces 18b of the reflecting layer 18 by including the intermediate layer 135. As a result, it is possible to form the shape of the diffuse reflecting surface in the transflective substrate 126 in accordance with the scattering property.

Figure 25:
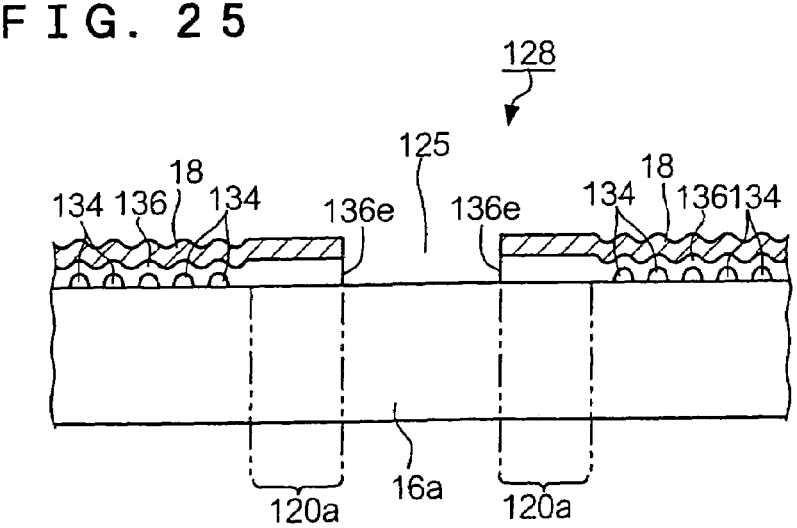
FIG. 25 is a partially sectional view of the transflective substrate according to the modification.

Furthermore, according to the above embodiment, the transflective substrate 124 is manufactured using the positive photosensitive material dissolved by exposure. However, a negative photosensitive material that is not solved by exposure may be used. FIG. 25 is a cross-sectional view of a transflective substrate 128 made of the negative photosensitive resin. As illustrated in FIG. 25, the transflective substrate 128 includes the first substrate 16a, a plurality of resin layers 134, intermediate layers 136, and the reflecting layers 18. The resin layers 134 are formed of the negative photosensitive resin on the substrate 16a in order to be separated from each other and to be protrusive. The intermediate layers 136 are formed of the photosensitive material as thin films in the region excluding the aperture 125 in order to cover the first substrate 16a and the resin layers 134. The surfaces of the intermediate layers 136 have shapes in accordance with the shapes of the surface of the first substrate 16a and the concavo-convex surfaces of the resin layers 134. The reflection layers 18 are stacked on the intermediate layers 136.

Figure 26:
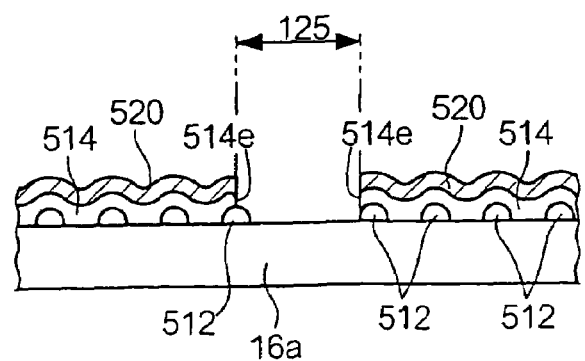
FIG. 26 is a cross-sectional view illustrating a comparative example to the modification.

Each resin layer 134 is exposed during the manufacturing step so that the same layer is not formed around the edge of the aperture 125 on the first substrate 16a. Therefore, flat surfaces 120a are provided between the aperture 125 and the regions where the resin layers 134 are formed. When the resin layers 134 are exposed without considering the flat surfaces 120a, as illustrated in FIG. 26, resin layers 512 are arranged near the edge of the aperture 125 or the resin layers 512 are formed to exceed the edge of the aperture 125. Therefore, adhesion between the sidewall surfaces 514e of the intermediate layers 514 and the substrate 16a deteriorates. As a result, during the step of forming the intermediate layers 514, some parts of the sidewall surfaces 514e are separated from the first substrate 16a when the aperture 125 is developed and are thereby removed.

In the transflective substrate 128 illustrated in FIG. 25, the resin layers 134 are not formed on the flat surfaces 120a.

Therefore, it is possible to prevent some parts of sidewall surfaces 136e from being separated from the first substrate 16a when the intermediate layers 136 are developed.

According to the first and second embodiments, the present invention is applied to the liquid crystal device using the TFD. However, the present invention can be applied to an active matrix liquid crystal device using a double-terminal switching element other than the TFD. The present invention can be also applied to an active matrix liquid crystal device using a three-terminal switching element such as a thin film transistor (TFT). The present invention can be also applied to a simple matrix liquid crystal device where the switching element is not used.

According to the above-mentioned embodiment, the liquid crystal device is used as an electro-optical device. However, the present invention is not limited thereto. The present invention can be applied to various electro-optical devices such as electro-luminescence (EL) devices, in particular, organic EL devices and inorganic EL devices, plasma display devices, field emission display (FED) devices, light emission diode (LED) display devices, electrophoresis display devices, small-sized television sets using thin Braun tubes and liquid crystal shutters, and devices using digital micro-mirror devices (DMD).

C. THIRD EMBODIMENT

Figure 27:
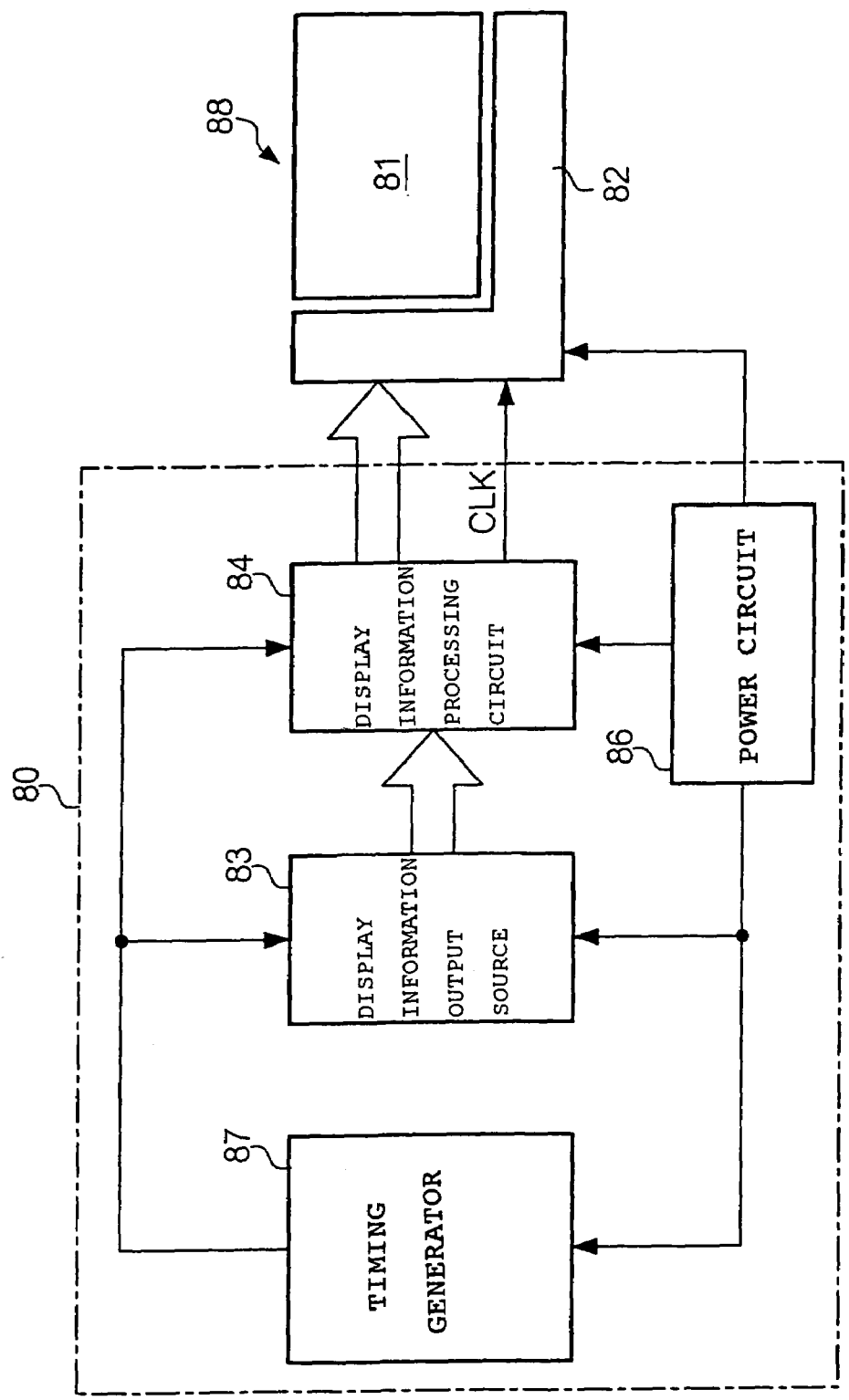
FIG. 27 is a block diagram illustrating an embodiment of an electronic apparatus according to the present invention.

An embodiment of an electronic apparatus according to the present invention will now be described in detail. FIG. 27 is a block diagram of an embodiment of an electronic apparatus. The electronic apparatus illustrated in FIG. 27 includes a liquid crystal device 88 and controlling means 80 for controlling the same. The liquid crystal device 88 includes a liquid crystal panel 81 having the structure described in the first embodiment or the second embodiment and a driving circuit 82 formed of a semiconductor IC. The controlling means 80 includes a display information output source 83, a display information processing circuit 84, a power circuit 86, and a timing generator 87.

The display information output source 83 includes a memory formed of a read only memory (ROM) or a random access memory (RAM), a storage unit formed of a magnetic recording disk or an optical recording disk, and a tuning circuit for synchronizing and outputting a digital picture signal.

Display information is supplied to the display information processing circuit 84 in the form of a picture signal of a predetermined format on the basis of various clock signals generated by the timing generator 87.

The display information processing circuit 84 includes various well-known circuits such as a serial-parallel conversion circuit, an amplification and inversion circuit, a rotation circuit, a gamma correction circuit, and a clamping circuit. The display information processing circuit 84 processes input display information and supplies the picture information to the driving circuit 82 together with a clock signal CLK. The driving circuit 82 includes a scanning line driving circuit, a data line driving circuit, and a testing circuit. The power circuit 86 supplies a predetermined voltage to each of the components.

Figure 28:
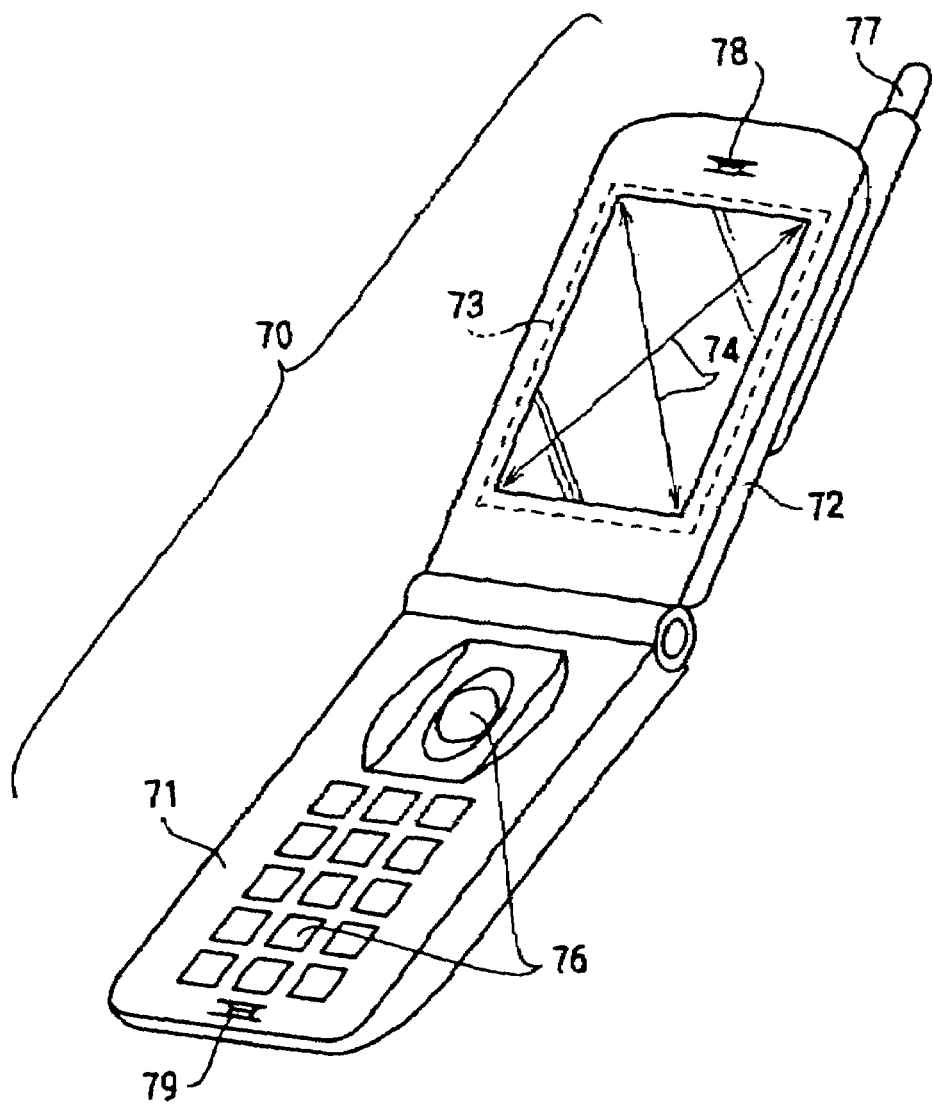
FIG. 28 is a perspective view illustrating a cellular phone according to another embodiment of the electronic apparatus according to the present invention.

FIG. 28 illustrates an embodiment for the case where the present invention is applied to the electronic apparatus of a cellular phone as the example. A cellular phone 70 includes a main body 71 and a display body 72 that is connected to the main body 71 and can be folded and unfolded. A display device 73 formed of the electro-optical device such as the liquid crystal device having the structure described in the first embodiment or the second embodiment is disposed inside the display body 72. Various displays related to telephone communications can be recognized by a display screen 74 in the display body 72. Manipulation buttons 76 are arranged on the front surface of the main body 71.

An antenna 77 is disposed at one end of the display body 72 and can be retractable. A speaker is disposed inside an earpiece 78. A built-in microphone is located inside a mouthpiece 79. A controller for controlling the operation of the display device 73 is a part of a controller for controlling the entire cellular phone, or is disposed in the main body 71 or the display body 72 in addition to the controller.

Figure 29:
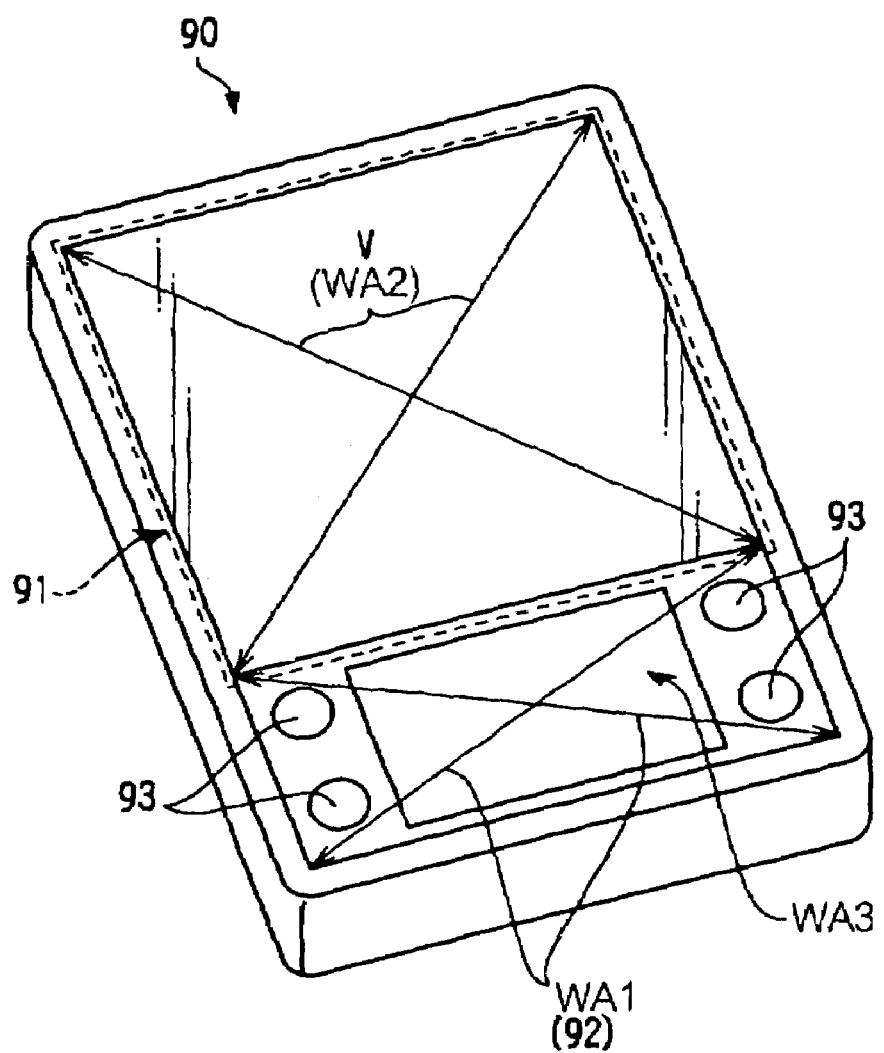
FIG. 29 is a perspective view illustrating a portable information terminal according to the other embodiment of the electronic apparatus according to the present invention.
Figure 31:
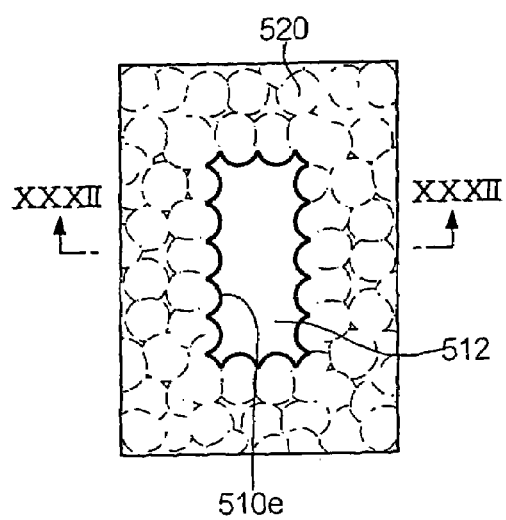
FIG. 31 is a plan view of a conventional transflective layer.
Figure 32:
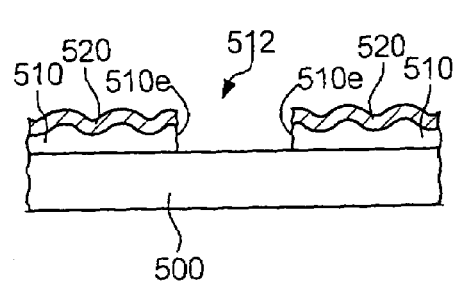
FIG. 32 is a cross-sectional view of the conventional transflective layer.
Figure 33:
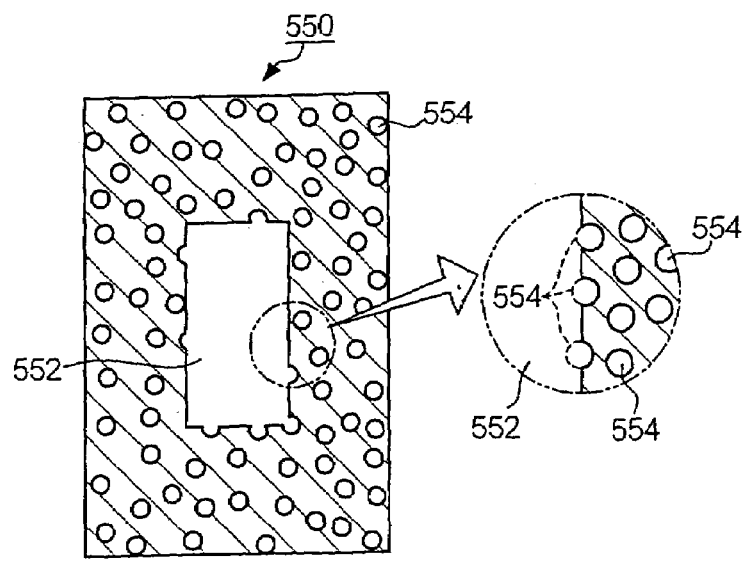
FIG. 33 is a plan view illustrating a mask used for forming a resin layer of the conventional transflective layer.

FIG. 29 illustrates an embodiment for the case where the present invention is applied to a portable information apparatus as the example. A portable information apparatus 90 is an information apparatus including a touch panel and a mounted liquid crystal device 91 having the structure described in the first embodiment or the second embodiment. The portable information apparatus 90 includes a display region V formed from a display surface of a liquid crystal device 91 and a first input region WA1 disposed below the display region V. An input sheet 92 is disposed in the first input region WA1.

The liquid crystal device 91 has a structure where the rectangular or square liquid crystal panel overlaps the rectangular or square touch panel in plan. The touch panel functions as an input panel. The touch panel is larger than the liquid crystal panel and protrudes to one end of the liquid crystal panel.

The touch panel is arranged in the display region V and the first input region WA1. The region corresponding to the display region V functions as a second input region WA2 where an input manipulation can be performed like the first input region WA1. The touch panel has a second surface positioned on the side of the liquid crystal panel and a first surface that faces the second surface. The input sheet 92 is attached to the first surface in the position corresponding to the first input region WA1.

A frame for identifying icons 93 and a hand-written character recognition region WA3 is printed in the input sheet 92. It is possible to select the icons 93 and to input data such as characters in the character recognition region WA3 by applying a load using fingers or a pen to the first surface of the touch panel through the input sheet 92 in the first input region WA1.

It is possible to observe images of the liquid crystal panel and to designate an appropriate position in an input mode screen by displaying the input mode screen on the liquid crystal panel and applying load to the first surface of the touch panel by fingers or a pen in the second input region WA2. As a result, it is possible to input data.

D. OTHER EMBODIMENTS

The preferred embodiments of the present invention are described. However, the present invention is not limited thereto. Various modifications can be made within the scope of the invention described in claims.

For example, the present invention can be used as the display portions of various electronic apparatuses such as computers, projectors, liquid crystal televisions, digital cameras, watches, vehicle-mounted apparatuses, duplicators/copying machines, and audio apparatuses as well as the above-mentioned cellular phones and portable information apparatuses.

The entire disclosure of Japanese Patent Application Nos. 2002-360977 filed Dec. 12, 2002 and 2003-064033 filed Mar. 10, 2003 are incorporated by reference.

What is claimed is:

1. A substrate for an electro-optical device, comprising:
   a substrate;
   a base layer formed on the substrate, the base layer having an edge that defines a boundary thereof as viewed in plan, a plurality of at least one of concave portions and convex portions on a surface thereof, and a flat section disposed between the edge and the plurality of at least one of concave portions and convex portions, the flat section is free of the concave and convex portions; and
   a reflecting layer formed on the base layer and having a light reflecting property,
   wherein all of the plurality of the at least one of concave portions and convex portions are separated from the edge of the base layer by the flat section by a distance in a range of 4 µm to 12 µm.

2. The substrate for an electro-optical device according to claim 1,
   further comprising an aperture including a light transmitting portion for transmitting light in the base layer, and
   wherein the reflecting layer is disposed in a portion excluding the aperture on the surface of the base layer.

3. An electro-optical device, comprising:
   the substrate for an electro-optical device according to claim 1;
   a counter substrate that faces the substrate for the electro-optical device; and
   an electro-optical material disposed between the substrate for the electro-optical device and the counter substrate.

4. The electro-optical device according to claim 3, comprising:
   a first electrode disposed on the substrate for the electro-optical device; and
   a second electrode disposed on the counter substrate,
   wherein the electro-optical material is a liquid crystal and the liquid crystal is disposed between the first electrode and the second electrode.

5. An electronic apparatus comprising the electro-optical device according to claim 3 as a display unit.

6. The substrate according to claim 1, wherein the edge of the base layer defines an internal boundary of the base layer as viewed in plan.

7. The substrate according to claim 1, wherein the edge of the base layer defines an external boundary of the base layer as viewed in plan.

8. An apparatus for an electronic device comprising:
   a substrate;
   a base layer on the substrate, said base layer having an upper surface and peripheral edges defining an outer boundary of the base layer;
   the upper surface of the base layer having an array of concave portions and an array of convex portions;
   a flat section disposed between the edges and both the concave portions and the convex portions, the flat section is free from both the convex portions and the concave portions, the flat section separates the concave and convex portions from the edges by a distance in a range of 4µm to 12µm; and
   a light reflecting layer on the upper surface of the base layer.

* * * * *